US012603501B2

(12) United States Patent

Benavent

(10) Patent No.: US 12,603,501 B2

(45) Date of Patent: Apr. 14, 2026

(54) DEVICE AND METHOD FOR CONTROLLING THE VOLTAGE OF MICROGRIDS USING A CENTRAL CONTROLLER AND A SECOND CONTROLLER

(71) Applicant: Electricite de France, Paris (FR)

(72) Inventor: Fabien Benavent, Paris (FR)

(73) Assignee: Electricite de France, Paris (FR)

( * ) Notice: Subject to any disclaimer, the term of this patent is extended or adjusted under 35 U.S.C. 154(b) by 412 days.

(21) Appl. No.: 18/037,360

(22) PCT Filed: Nov. 17, 2021

(86) PCT No.: PCT/FR2021/052029

§ 371 (c)(1),
(2) Date: May 17, 2023

(87) PCT Pub. No.: WO2022/106782

PCT Pub. Date: May 27, 2022

(65) Prior Publication Data

US 2023/0420945 A1     Dec. 28, 2023

(30) Foreign Application Priority Data

Nov. 18, 2020     (FR) ...................................... 2011830

(51) Int. Cl.
*H02J 3/32*          (2006.01)
*H02J 3/48*          (2006.01)
*H02J 3/50*          (2006.01)

(52) U.S. Cl.
CPC   *H02J 3/32* (2013.01); *H02J 3/48* (2013.01); *H02J 3/50* (2013.01)

(58) Field of Classification Search
None
See application file for complete search history.

(56) References Cited

U.S. PATENT DOCUMENTS

2014/0316604 A1* 10/2014 Ortjohann ............... H02J 3/381
                                                        700/298
2016/0204611 A1   7/2016 Chambon
                      (Continued)

FOREIGN PATENT DOCUMENTS

| | | |
|---|---|---|
| CN | 108777493 A | 11/2018 |
| CN | 109038644 A | 12/2018 |
| KR | 20140098431 A | 8/2014 |

OTHER PUBLICATIONS

International Search Report for PCT/FR2021/052029 mailed May 10, 22. 3 pgs.

(Continued)

*Primary Examiner* — Bernard G Lindsay

(74) *Attorney, Agent, or Firm* — Lerner David LLP

(57)          ABSTRACT

The present invention concerns a device for controlling a plant with an electricity generation and/or electricity storage unit and a connection terminal intended to be connected to a microgrid, comprising an automatic controller (100) configured to compute a setpoint voltage $U_{ref(i)}$ of each unit, members (1, 2, 3, 4$_i$, 5) for measuring or determining a total active power $P_{centrale}$, a voltage $U_{Rmes}$ of the terminal, of a voltage reference $U_{centraleRef}$ according to a function f depending at least on the total active power $P_{centrale}$, of a first individual reactive power $Q_{mes(i)}$ of each unit, a first voltage corrector (5), having a second prescribed transfer function corr, the automatic controller being configured to compute $U_{centraleRef} = f(P_{centrale})$, and $U_{offset} = corr(U_{centraleRef} - U_{Rmes})$ and $U_{ref(i)} = U_{offset(i)} - K_{UQ(i)} - Q_{mes(i)}$.

15 Claims, 16 Drawing Sheets

(56) References Cited

U.S. PATENT DOCUMENTS

| | | | | |
|---|---|---|---|---|
| 2017/0338652 A1* | 11/2017 | Ubben | ..................... | H02J 3/18 |
| 2019/0341781 A1* | 11/2019 | Marchegiani | ............. | H02J 3/46 |
| 2020/0272118 A1* | 8/2020 | Tuckey | ................... | H02J 3/003 |
| 2020/0287410 A1* | 9/2020 | Zhao | ..................... | G05B 11/36 |

OTHER PUBLICATIONS

French Preliminary Search Report for Application No. FR2011830 dated Oct. 15, 2021. 2 pgs. (see p. 2, categorizing the cited references).

Machowski, J. et al., "Power System Dynamics: Stability and Control", Wiley, (2020), pp. 7 and 8, "Book available upon request". 3 pgs.

Guerrero, M., et al., "Hierarchical Control of Droop-Controlled AC and DC Microgrids—A General Approach Toward Standardization," in IEEE Transactions on Industrial Electronics (Aug. 2010). 6 pgs.

Shafiee, Q., et al., "Distributed Secondary Control for Islanded Microgrids—A Novel Approach," in IEEE Transactions on Power Electronics, vol. 29, No. 2, pp. 1018-1031, Feb. 2014, doi: 10.1109/TPEL.2013.2259506. 14 pgs.

Rocabert, J., et al., , "Control of Power Converters in AC Microgrids," in IEEE Transactions on Power Electronics, vol. 27, No. 11, pp. 4734-4749, Nov. 2012, doi: 10.1109/TPEL.2012.2199334. 16 pgs.

Mohapatra, A., et al., "A review on MPPT techniques of PV system under partial shading condition", Renewable and Sustainable Energy Reviews, vol. 80, Dec. 2017, pp. 854-867. https://doi.org/10.1016/j.rser.2017.05.083. 14 pgs.

He, J., et al., "An Islanding Microgrid Power Sharing Approach Using Enhanced Virtual Impedance Control Scheme," In IEEE Transactions on Power Electronics, vol. 28, No. 11, pp. 5272-5282, Nov. 2013, doi: 10.1109/TPEL.2013.2243757. 11 pgs.

Cenelec, "CLC/TS 50549-2, Requirements for generating plants to be connected in parallel with distribution networks—Part 2: Connection to a MV distribution network", European Committee for Electrotechnical Standardization, (Jan. 2015). 57 pgs.

* cited by examiner

100 fH $U_{centraleRef}$ $U_{centraleRef}$ $U_{max}$ $U_N$ $U_{min}$ $P_{centrale}$

0

P3

P2

P1

P4

SFPB2

Low-pass filter

FPB2

EFPB2

$P_{centrale}$ 3,f

DEVICE AND METHOD FOR CONTROLLING THE VOLTAGE OF MICROGRIDS USING A CENTRAL CONTROLLER AND A SECOND CONTROLLER

CROSS-REFERENCE TO RELATED APPLICATIONS

The present application is a national phase entry under 35 U.S.C § 371 of International Application No. PCT/FR2021/052029 filed Nov. 17, 2021, which claims priority from French Application No. 2011830 filed Nov. 18, 2020, all of which are hereby incorporated herein by reference.

The invention relates to a device for controlling one or more electricity generation unit(s) and/or electricity storage unit(s), intended to be connected to at least one line of an electricity consumption and/or production microgrid.

The field of the invention relates to electricity consumption and/or production microgrids comprising on the one hand one or more first centralized electricity production sources (denoted $G_1$, $G_2$, ... $G_M$ in the remainder of the text and which can for example be heat sources (diesel or coal for example, or others and second electricity production sources distributed on lines connected to the first sources, the second electricity production sources being able to operate intermittently and able to comprise, for example, photovoltaic or windpower electricity production sources. The first centralized electricity production sources can operate the entirety of the time.

Microgrids can operate with a low consumption (for example an order of magnitude of consumption less than a few tens of MW) and independently a part or the entirety of the time. These distributed energy sources are in general renewable producers with or without energy storage batteries. These microgrids can for example be present on islands, or in places which are hard to access, such as for example mountain regions or deserts.

In a first type of electrical systems, namely conventional electrical systems possessing a transmission grid, the operation and system services of these electrical systems are based on the U-Q (voltage-reactive power) correlation on the one hand and the f-P (frequency-active power) correlation on the other hand. These correlations are the consequence of the electrical characteristics of HV overhead lines (high voltage, for electrical installations in which the voltage exceeds 50000 volts AC) which have an equivalent impedance of highly inductive nature.

By treating the equivalent impedance of an HV line as its equivalent reactance X between two nodes N1 and N2 according to FIG. 1 and by linearizing the equations of active power and reactive power of the node N1, the currently-used expressions below are given:

$$P_1 \approx \frac{U_1 U_2}{X}[\theta_1 - \theta_2]$$

$$Q_1 \approx \frac{U_1}{X}[U_1 - U_2]$$

With:

$P_1$, $Q_1$, $U_1$ and $\theta_1$ the active power, the reactive power, the rms value of the phase-to-phase voltages and the voltage angle of the node N1 respectively, $U_2$ and $\theta_2$ respectively the rms value of the phase-to-phase voltages and the voltage angle of the node N2 respectively, X the equivalent reactance of the HV overhead line.

These equations illustrate the correlations U-Q and f-P mentioned above, the active power $P_1$ is proportional to the difference $\theta_1 - \theta_2$ between the angles of the voltages which themselves correspond to the integrals of the frequencies of the two nodes N1 and N2, multiplied by a factor of $2\pi$ and the reactive power $Q_1$ is proportional to the difference $U_1 - U_2$ between the voltages of the two nodes N1 and N2.

Consequently, the voltage of the transmission grid can be controlled by the production sets, the devices for supplying and/or offsetting reactive power, at their different connection points while having a negligeable impact on active power flows within the system.

In a second type of electrical system, namely microgrids without distributed energy sources, the conventional structure of the microgrids consists in FIG. 2 in a single thermal plant C composed of several production sets $G_1$, $G_2$, ... $G_M$ and connected to several outgoing lines $D_1$, $D_2$, ... , $D_N$ where consumer stations $PC_I$, $PC_{I+1}$, $PC_{I+2}$ are distributed.

Unlike conventional systems, the voltage level generally corresponds to MV of type A (medium voltage for electrical installations in which the voltage exceeds 1000 volts without exceeding 50000 volts AC) or LV (low voltage, for electrical installations in which the voltages are between 50 and 1000 volts in AC voltage rating) and the impedance of the lines is mostly resistive in the case of the overhead lines or resistive-capacitive in the case of subterranean lines. The correlations presented above for the first type of electrical system are consequently inoperative and must be recomputed.

The MV and LV overhead lines can be modelled according to FIG. 3 with, between the two electrical nodes N1 and N2 connected by the line, a resistance R in series with an equivalent potentially non-negligeable inductance X.

By linearizing the equations of the active power and of the reactive power at the node N1 one obtains the expressions below:

$$P_1 \approx \frac{XU_1 U_2}{R^2 + X^2}[\theta_1 - \theta_2] + \frac{RU_1}{R^2 + X^2}[U_1 - U_2]$$

$$Q_1 \approx \frac{XU_1}{R^2 + X^2}[U_1 - U_2] - \frac{RU_1 U_2}{R^2 + X^2}[\theta_1 - \theta_2]$$

With:

$P_1$, $Q_1$, $U_1$ and $\theta_1$ the active power, the reactive power, the rms value of the phase-to-phase voltages and the voltage angle of the node N1 respectively $U_2$ and $\theta_2$ the rms value of the phase-to-phase voltages and the voltage angle of the mode N2 respectively R and X the equivalent resistance and the equivalent reactance of the MV or LV overhead line.

The active and reactive powers $P_1$, $Q_1$ depend in these conditions both on the difference $U_1 - U_2$ between the rms values of the voltages and on the difference $\theta_1 - \theta_2$ between their angles.

By neglecting the equivalent reactance X of the line in view of its equivalent resistance R, one obtains the simplified expressions below:

$$P_1 \approx \frac{U_1}{R}[U_1 - U_2]$$

-continued $$Q_1 \approx -\frac{U_1 U_2}{R}[\theta_1 - \theta_2]$$

One then observes an inversion of the existing correlations in the electrical systems of the first type possessing a transmission grid to obtain the new U-P and f-Q correlations for installations of the second type.

Consequently, if the thermal production sets $G_1$, $G_2$, . . . $G_M$ of a microgrid were distributed instead of being centralized as illustrated in FIG. 4, their control should be fully adapted to take into account the U-P and f-Q correlations: the voltage of the production sets $G_1$, $G_2$, . . . $G_M$ would be modulated to regulate their active power and their frequency would be modulated to regulate their reactive power.

Below is a description of a primary voltage setting and a sharing of the reactive power load, of the prior art. For the centralized production sets $G_1$, $G_2$, . . . $G_M$ in the great majority of microgrids, the correlations defined above for the first type are applicable between the sets $G_1$, $G_2$, . . . $G_M$ since the equivalent impedance of the alternator-transformer assemblies of these sets $G_1$, $G_2$, . . . $G_M$ is mostly inductive.

The example below from FIG. 5 shows two centralized production sets $G_1$ and $G_2$, modeled equivalently downstream of their step-up transformer (on the grid side), supplying a load consuming the reactive power Q R and modeled by an ideal current source, connected to the same electrical node $N_{centrale}$ as the centralized production sets $G_1$ and $G_2$.

The reactive powers supplied by the sets $G_1$ and $G_2$ at their stator can be expressed by the following equations:

$$Q_{G_1} \approx \frac{X_{G_2}}{X_{G_1} + X_{G_2}} \sqrt{3}\, U_{G_1} I_R \sin(\theta_{G_1} - \gamma_R) + \frac{U_{G_1}[U_{G_1} - U_{G_2}]}{X_{G_1} + X_{G_2}}$$

$$Q_{G_2} \approx \frac{X_{G_1}}{X_{G_1} + X_{G_2}} \sqrt{3}\, U_{G_2} I_R \sin(\theta_{G_2} - \gamma_R) + \frac{U_{G_2}[U_{G_2} - U_{G_1}]}{X_{G_1} + X_{G_2}}$$

With:

$Q_{G_1}$ and $Q_{G_2}$ the reactive powers injected by the two sets $G_1$ and $G_2$ at their stator, $X_{G_1}$ and $X_{G_2}$ the equivalent reactances of the alternator-transformer assemblies of the two sets $G_1$ and $G_2$ as seen by the grid side, $\theta_{G_1}$ and $\theta_{G_2}$ the angles of the voltages of the two sets $G_1$ and $G_2$ as seen by the grid side, $I_R$ and $\gamma_R$ the rms value and the current angle of the load $Q_R$, $U_{G_1}$ and $U_{G_2}$ the voltages of the two sets $G_1$ and $G_2$ at their stator as seen by the grid side.

In these equations, the first terms $$\frac{X_{G_2}}{X_{G_1} + X_{G_2}} \sqrt{3}\, U_{G_1} I_R \sin(\theta_{G_1} - \gamma_R)$$

$$\text{and } \frac{X_{G_1}}{X_{G_1} + X_{G_2}} \sqrt{3}\, U_{G_2} I_R \sin(\theta_{G_2} - \gamma_R)$$

correspond to what can be considered as the "natural contribution" of the production sets $G_1$ and $G_2$ to the reactive power supply. This mainly depends on the term $$\frac{X_{G_2}}{X_{G_1} + X_{G_2}}$$

for the set $G_1$ and the term $$\frac{X_{G_1}}{X_{G_1} + X_{G_2}}$$

for the set $G_2$. These terms express the fact that the set $G_1$ or $G_2$ with the lowest equivalent reactance will supply more reactive power to the load than the set $G_2$ or $G_1$ with the greatest equivalent reactance.

The second terms $$\frac{U_{G_1}[U_{G_1} - U_{G_2}]}{X_{G_1} + X_{G_2}} \text{ and } \frac{U_{G_2}[U_{G_2} - U_{G_1}]}{X_{G_1} + X_{G_2}}$$

correspond to what can be considered as the "controlled contribution" of the production sets $G_1$ and $G_2$ to the reactive power supply. They express the fact that the set $G_1$ or $G_2$ with the highest stator voltage will supply more reactive power to the load than its natural contribution while the sets $G_2$ or $G_1$ with the lowest stator voltage will supply less reactive power to the load than its natural contribution.

It can consequently be noted that if the stator voltages of the sets $G_1$ and $G_2$ are identical, the controlled contribution to the reactive power supply does not exist and only the ratio of the equivalent reactances of the sets $G_1$ and $G_2$ determines their reactive power supply. There is in this case no consideration for the reactive power capacities of the sets $G_1$ and $G_2$ which can be asymmetrical which manifests as a deoptimization of the system.

Conversely, the modulation of the voltages of the sets $G_1$ and $G_2$ makes it possible to control the reactive power injection of the sets $G_1$ and $G_2$.

In a third type of electrical installation, the microgrid energy transition manifests in some cases as the installation of significant renewable energy capacity, particularly photovoltaic plants, which can exceed by several times the maximum power consumption of microgrids where active power is concerned. It is then essential to install a storage solution, often consisting of electrochemical batteries.

These same microgrids are generally required to operate during a part of the day with few or no centralized thermal production sets $G_1$, $G_2$, . . . $G_M$ and it is consequently necessary for the storage batteries to possess an operating mode making it possible to supplement and replace the system services performed by the thermal production sets $G_1$, $G_2$, . . . $G_M$ such as voltage setting, frequency setting, default current injection and the capacity to re-supply the microgrid after a general incident (capacity for a "black start", i.e. a cold start). For the correct operation of these system services it is then preferable for these storage batteries Bat to be centralized with the thermal sets $G_1$, $G_2$, . . . $G_M$ in an electricity production and electricity storage plant C. The resulting microgrid structure is shown in FIG. 6.

With this new structure of FIG. 6, the assembly C of the batteries Bat and of the thermal production sets $G_1$, $G_2$, . . . $G_M$ can be separated from the renewable electricity production sources S distributed with the consumer stations $PC_I$, $PC_{I+1}$, $PC_{I+2}$ on the outgoing lines $D_1$, $D_2, \ldots, D_N$ by significant lengths of these MV of A type or LV overhead or subterranean lines and it is hence necessary to consider two physical correlation levels: the production/storage unit correlations applicable within the plant C, and the correlations between the plant C and the decentralized electricity production sources S.

At the level of the electricity production and electricity storage plant C, the incorporation of storage batteries Bat does not modify the operation described above for the second type of installations and it possible to model its different sources in a similar way, as shown in FIG. 7.

The reactive power supply equations are identical to those mentioned above for this second type if one replaces the indices of the quantities relating to the set $G_2$ with the indices B of the battery Bat (voltage $U_B$ of the battery Bat, equivalent reactance $X_B$ of the battery Bat shown in FIG. 7).

Below is a description of the correlations between the plant C and the decentralized energy production sources S and the problem of the voltage withstand of the microgrid.

Since the plant C and the decentralized electricity production sources S are connected by MV of A type or LV overhead lines, the applicable correlations are those of the second type of installation, i.e. U-P and f-Q.

Its impact on the voltage withstand of the microgrid can be illustrated through the example of a photovoltaic decentralized electricity production source S charging a battery Bat of the plant C through an overhead line likened to its equivalent resistance R between the node N1 located on the side of the plant C and the node N2 located on the side of the photovoltaic decentralized electricity production source S in FIG. 8.

In the example of FIG. 8, the photovoltaic decentralized electricity production source S can inject the maximum available active power owing to a maximum power point tracking algorithm and the battery Bat can maintain the voltage of the node N1 located on the side of the plant C at a value near to the nominal voltage if it possesses a reactive power sharing algorithm or exactly at the nominal voltage if a secondary voltage control algorithm is also used.

In this situation, the effective value $U_2$ of the voltage at the node N2 on the side of the photovoltaic decentralized electricity production source S can be computed via the following equation, where $U_1$ is the rms value of the voltage at the node N1:

$$U_2 \approx U_1 - \frac{RP_1}{U_1}; \text{ with } P_1 < 0$$

For a voltage $U_1$ set by the battery and a given equivalent line resistance R, the rise of the voltage $U_2$ is therefore proportional to the active power flow $P_1$ charging the battery Bat. Thus, a first drawback is that if this flow is sufficiently high, the voltage $U_2$ will fall outside the contractually-agreed range.

More generally, by replicating the complete structure of a microgrid of FIG. 6, this first drawback is expressed by the fact that a part of the microgrid could find itself in over-voltage due to high active power flows from the decentral-ized electricity production sources S toward the battery Bat.

Although the operation of the microgrids in the presence of distributed energy sources S has been the subject of scientific publications, these are mainly concentrated on the sharing of the load between thermal sets G and/or decen-tralized storage batteries by making provision for load-sharing algorithms taking into consideration the correlations due to the MV of type A or LV overhead lines (see second type mentioned above), for example with a sharing of the active and reactive power load by stagnation of the type:

$$U_{ref} = U_N - K_{UP}P - K_{UQ}Q$$

$$f_{ref} = f_N - K_{fP}P - K_{fQ}Q$$

With:

$U_{ref}$ and $f_{ref}$ the voltage and frequency references of each thermal unit and battery P and Q the active power and the reactive power injected by each thermal unit and battery $K_{UP}$, $K_{UQ}$, $K_{fP}$, $K_{fQ}$ the control coefficients of the algo-rithm.

More complex algorithms using the concept of virtual impedance have also been proposed in order to improve the quality of load-sharing; nevertheless, their aim remains the same.

Certain publications describe secondary control algo-rithms, but without addressing the first drawback mentioned above. Specifically, the use of such secondary voltage adjustments aims to bring the voltage of the controlled electrical node to a fixed value, typically the nominal value, without taking into consideration the voltage withstand of the rest of the grid which risks going outside its contractu-ally-agreed range during periods of high injections of active power from the decentralized electricity production sources S toward the centralized battery $Bat_i$, which is a second additional drawback.

Thus, the problem is that the existing voltage control solutions consisting of reactive power-sharing algorithms, coupled or not coupled with a secondary voltage control algorithm, operating according to the prior art are inadequate when it comes to ensuring the voltage withstand of the whole of the grid in the presence of decentralized producers and do not make it possible to palliate the first and second drawbacks mentioned above.

One goal of the invention is to obtain a device for controlling the voltage of microgrids owing to the control of at least one electricity production unit and/or at least one electricity storage unit, which palliates the drawbacks men-tioned above.

For this purpose, a first subject of the invention is a device for controlling a plant, wherein the plant comprises at least one electricity generation unit and/or at least one electricity storage unit, and at least one common connection terminal, which is connected to the electricity generation unit and/or to the electricity storage unit and which is intended to be connected to at least one line of an electricity consumption and/or production microgrid, the control device comprising at least one first central automatic controller as well as at least one second automatic controller for each electricity generation unit and/or electricity storage unit, the second automatic controller being connected to the first central automatic controller, the first central automatic controller being configured to compute and transmit to the second automatic controller at least one offset voltage $U_{offset(i)}$ of each electricity generation unit and/or of each elec-tricity storage unit, so that the voltage of the common connection terminal is set to a voltage reference $U_{centraleRef}$, characterized in that the first central automatic controller comprises a first member for measuring or determining a total active power $P_{centrale}$ leaving the plant, supplied or absorbed by the electricity generation unit and/or the electricity storage unit, a second member for measuring or determining a voltage $U_{Rmes}$ of the common connection terminal, a third computing member for computing the voltage reference $U_{centraleRef}$ of the common connection terminal according to a first prescribed function f depending at least on the total active power $P_{centrale}$, each second automatic controller comprises a fourth member for measuring or determining a first individual reactive power $Q_{mes(i)}$ supplied or absorbed by the electricity generation unit associated with this second automatic controller and/or the electricity storage unit associated with this second automatic controller to the connection terminal, the first central automatic controller comprises a first voltage corrector, having a second prescribed transfer function corr, the first automatic controller being configured to compute $$U_{centraleRef} = f(P_{centrale})$$

$$U_{offset} = \mathrm{corr}(U_{centraleRef} - U_{Rmes})$$

where $U_{offset}$ is a first central offset voltage, computed by applying the second prescribed transfer function corr of the first corrector to the difference $U_{centraleRef} - U_{Rmes}$, the first automatic controller is configured to compute the second offset voltage $U_{offset(i)}$ according to a third prescribed function from the first central offset voltage $U_{offset}$ and to transmit the second offset voltage $U_{offset(i)}$ to the second automatic controller for the electricity generation unit associated with this second automatic controller and/or for the electricity storage unit associated with this second automatic controller, the second automatic controller is configured to compute at least a local setpoint voltage $U_{ref(i)}$ for the electricity generation unit associated with this second automatic controller and/or for the electricity storage unit associated with this second automatic controller, according to $$U_{ref(i)} = U_{offset(i)} - K_{UQ(i)} \cdot Q_{mes(i)}$$

where $K_{UQ(i)}$ is a prescribed, non-zero coefficient.

Owing to the invention, the first and second abovementioned drawbacks are remedied.

According to an embodiment of the invention, the first central automatic controller comprises another member for measuring or determining a first total reactive power $Q_{mes}$ leaving the plant, supplied or absorbed by the electricity generation unit and/or the electricity storage unit, the first prescribed function f depends at least on:

the total active power $P_{centrale}$ leaving the plant, supplied or absorbed by the electricity generation unit and/or the electricity storage unit, and on the first total reactive power $Q_{mes}$ leaving the plant, supplied or absorbed by the electricity generation unit and/or the electricity storage unit.

According to an embodiment of the invention, the first prescribed function f is affine or linear and depends on:

the total active power $P_{centrale}$ leaving the plant, supplied or absorbed by the electricity generation unit and/or the electricity storage unit.

According to an embodiment of the invention, the first central automatic controller comprises another member for measuring or determining a first total reactive power $Q_{mes}$ leaving the plant, supplied or absorbed by the electricity generation unit and/or the electricity storage unit, the first prescribed function f is affine or linear and depends:

on the total active power $P_{centrale}$ leaving the plant, supplied or absorbed by the electricity generation unit and/or the electricity storage unit, and on the first total reactive power $Q_{mes}$ leaving the plant, supplied or absorbed by the electricity generation unit and/or the electricity storage unit.

According to an embodiment of the invention, the first prescribed function f comprises a hysteresis function, which takes for the increasing values of the total active power $P_{centrale}$ leaving the plant, supplied or absorbed by the electricity generation unit and/or the electricity storage unit:

a strictly positive and prescribed nominal voltage value, when the increasing values of the total active power $P_{centrale}$ leaving the plant, supplied or absorbed by the electricity generation unit and/or the electricity storage unit become higher than or equal to a first prescribed strictly negative active power value while remaining lower than a second prescribed strictly positive active power value, a strictly positive and prescribed minimum voltage value, when the increasing values of the total active power $P_{centrale}$ leaving the plant, supplied or absorbed by the electricity generation unit and/or the electricity storage unit remain lower than the first prescribed strictly negative active power value, a strictly positive and prescribed maximum voltage value, when the increasing values of the total active power $P_{centrale}$ leaving the plant, supplied or absorbed by the electricity generation unit and/or the electricity storage unit are higher than the second prescribed strictly positive active power value, the prescribed nominal voltage value being higher than the prescribed minimum voltage value and being lower than the prescribed maximum voltage value, the hysteresis function taking for the decreasing values of the total active power $P_{centrale}$ leaving the plant, supplied or absorbed by the electricity generation unit and/or the electricity storage unit:

the strictly positive prescribed nominal voltage value, when the decreasing values of the total active power $P_{centrale}$ leaving the plant, supplied or absorbed by the electricity generation unit and/or the electricity storage unit become lower than or equal to a third prescribed strictly positive active power value while remaining higher than a fourth prescribed strictly negative active power value, the strictly positive minimum voltage value, when the decreasing values of the total active power $P_{centrale}$ leaving the plant, supplied or absorbed by the electricity generation unit and/or the electricity storage unit are lower than the fourth prescribed strictly negative active power value, the strictly positive maximum voltage value, when the decreasing values of the total active power $P_{centrale}$ leaving the plant, supplied or absorbed by the electricity generation unit and/or the electricity storage unit are higher than the third prescribed strictly positive active power value, the third prescribed strictly positive active power value being lower than the second prescribed strictly positive active power value, the fourth prescribed strictly negative active power value being lower than the first prescribed strictly negative active power value.

According to an embodiment of the invention, the first automatic controller further comprises at least a fifth receiving member to receive:

first voltage remote measurement values respectively of decentralized electricity production sources of the electricity consumption and/or production microgrid, remote by at least a non-zero distance from one another and from the common connection terminal of the plant, second voltage remote measurement values respectively of decentralized electricity consumer stations of the line of the electricity consumption and/or production microgrid, remote by at least a non-zero distance from one another and from the common connection terminal of the plant, the first prescribed function f comprises:

computing a voltage maximum of the voltage $U_{Rmes}$ of the common connection terminal of the plant and of the first voltage remote measurement values respectively of the decentralized electricity production sources of the electricity consumption and/or production microgrid, computing a voltage minimum of the voltage $U_{Rmes}$ of the common connection terminal of the plant and of the second voltage remote measurement values respectively of the decentralized electricity consumer stations of the electricity consumption and/or production microgrid, taking into account the half-sum of the voltage maximum and of the voltage minimum for the computation of the voltage reference $U_{centraleRef}$.

According to an embodiment of the invention, the third computing member comprises a second corrector of proportional-integral-derivative type supplying the voltage reference $U_{centraleRef}$ from the difference between on the one hand a prescribed nominal voltage of the microgrid and on the other hand the half-sum of the voltage maximum and of the voltage minimum.

According to an embodiment of the invention, the first central automatic controller comprises another member for measuring or determining a first total reactive power $Q_{mes}$ leaving the plant, supplied or absorbed by the electricity generation unit and/or the electricity storage unit, the first automatic controller comprises:

a sixth member for computing reactive power setpoints of respective decentralized electricity production sources of the electricity consumption and/or production microgrid, remote by at least a non-zero distance from the common connection terminal, which are proportions at least of the first total reactive power $Q_{mes}$ leaving the plant, supplied or absorbed by the electricity generation unit and/or the electricity storage unit.

According to an embodiment of the invention, the first automatic controller further comprises at least a seventh receiving member yé-to receive:

third respective reactive power remote measurement values of the respective decentralized electricity production sources of the electricity consumption and/or production microgrid, the sixth computing member being configured to compute a second total reactive power equal to the sum of the first total reactive power $Q_{mes}$ leaving the plant, supplied or absorbed by the electricity generation unit and/or the electricity storage unit and of the third reactive power remote measurement values of the respective decentralized electricity production sources of the electricity consumption and/or production microgrid and to compute the reactive power setpoints of the respective decentralized electricity production sources of the electricity consumption and/or production microgrid as being proportions of said sum.

According to an embodiment of the invention, said proportions in the reactive power setpoints of the respective decentralized electricity production sources of the electricity consumption and/or production microgrid correspond to respective ratios of a prescribed reactive power capacity of the respective decentralized electricity production sources of the electricity consumption and/or production microgrid, divided by a sum of the prescribed reactive power capacities of the respective electricity production sources of the line of the electricity consumption and/or production microgrid and of the respective prescribed reactive power capacities of the electricity generation unit and/or of the electricity storage unit.

According to an embodiment of the invention, the third prescribed function comprises the division of the first central offset voltage U offset by a prescribed nominal voltage of the electricity generation unit and/or of the electricity storage unit.

According to an embodiment of the invention, the first central automatic controller comprises, as other member, another member for determining the first total reactive power $Q_{mes}$ leaving the plant, supplied or absorbed by the electricity generation unit and/or the electricity storage unit by summing the first individual reactive powers $Q_{mes(i)}$.

According to an embodiment of the invention, the first central automatic controller comprises, as other member, another member for measuring the first total reactive power $Q_{mes}$ leaving the plant, supplied or absorbed by the electricity generation unit and/or the electricity storage unit on the common connection terminal.

A second subject of the invention is a method for controlling a plant, wherein the plant comprises at least one electricity generation unit and/or at least one electricity storage unit, and at least one common connection terminal, which is connected to the electricity generation unit and/or to the electricity storage unit and which is intended to be connected to at least one line of an electricity consumption and/or production microgrid, a method in which a central automatic controller for controlling the electricity generation unit and/or of the electricity storage unit computes and transmits at least one offset voltage $U_{offset(i)}$ of each electricity generation unit and/or of each electricity storage unit to at least a second automatic controller for controlling each electricity generation unit and/or electricity storage unit, so that the voltage of the common connection terminal is set to a voltage reference $U_{centraleRef}$, characterized by measuring or determining by a first measuring or determining member of the first central automatic controller a total active power $P_{centrale}$ leaving the plant, supplied or absorbed by the electricity generation unit and/or the electricity storage unit, measuring by a second measuring member of the first central automatic controller a voltage $U_{Rmes}$ of the common connection terminal, computing by a third computing member of the first central automatic controller a voltage reference $U_{centraleRef}$ of the common connection terminal according to a first prescribed function f depending at least on the total active power $P_{centrale}$, measuring or determining by a fourth measuring or determining member of the second automatic controller a first individual reactive power $Q_{mes(i)}$ supplied or absorbed by the electricity generation unit associated with this second automatic controller and/or by the electricity storage unit associated with this second automatic controller to the connection terminal, the first central automatic controller having a first voltage corrector, having a second prescribed transfer function corr, computing by the first central automatic controller $$U_{centraleRef} = f(P_{centrale})$$

$$U_{offset} = \mathrm{corr}(U_{centraleRef} - U_{Rmes})$$

where $U_{offset}$ is a first central offset voltage, computed by applying the second prescribed transfer function corr of the first corrector to the difference $U_{centraleRef} - U_{Rmes}$, computing by the first automatic controller the second offset voltage $U_{offset(i)}$ from the first central offset voltage $U_{offset}$ according to a third prescribed function and transmitting by the first automatic controller the second offset voltage $U_{offset(i)}$ to the second automatic controller for the electricity generation unit associated with this second automatic controller and/or for the electricity storage unit associated with this second automatic controller, computing by the second automatic controller at least a local setpoint voltage $U_{ref(i)}$ for the electricity generation unit associated with this second automatic controller and/or for the electricity storage unit associated with this second automatic controller, according to $$U_{ref(i)} = U_{offset(i)} - K_{UQ(i)} \cdot Q_{mes(i)}$$

where $K_{UQ(i)}$ is a prescribed, non-zero coefficient.

A third subject of the invention is a computer program comprising code instructions for implementing the method for controlling a plant having at least one electricity generation unit and/or at least one electricity storage unit as described above, when it is executed by at least one automatic controller.

The invention will be better understood on reading the following description, given solely by way of non-limiting example with reference to the figures below of the appended drawings.

FIG. 14 is a diagram of the control device according to embodiments of the invention.

FIG. 15 is a diagram of the control device according to embodiments of the invention.

FIG. 16 is a diagram of the control device according to embodiments of the invention.

FIG. 22 is a diagram of the control device according to embodiments of the invention.

Below is a more detailed description, with reference to FIGS. 9 to 24, of examples of devices 1000 for controlling one (or more) electricity generation units $G_i$ and/or one (or more) electricity storage units (Bat$_i$). This control device 1000 is composed of a first central automatic controller 100 equivalent to an energy management system as well as a second automatic controller $A_i$ per electricity production unit $G_i$ and/or a second automatic controller $A_i$ per electricity storage unit Bat$_i$. In the remainder of the text, the index i indicates what provision is made for each electricity production unit $G_i$ and/or each second automatic controller $A_i$ associated with this electricity production unit $G_i$ or with this electricity storage unit Bat$_i$. There can therefore be one or more second automatic controllers $A_i$. The second automatic controller for controlling each electricity production unit $G_i$ or of each electricity storage unit Bat$_i$ regulates the internal voltage of this electricity production unit $G_i$ or of this electricity storage unit Bat$_i$.

Figure 1:
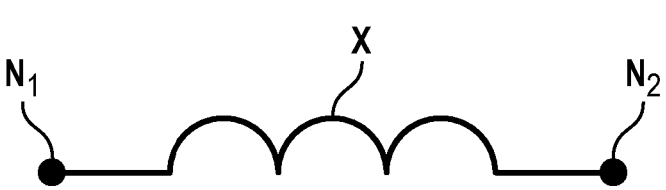
FIG. 1 is an equivalent electrical diagram of an HV electrical line of type B for a first type of electrical system, according to the prior art.
Figure 2:
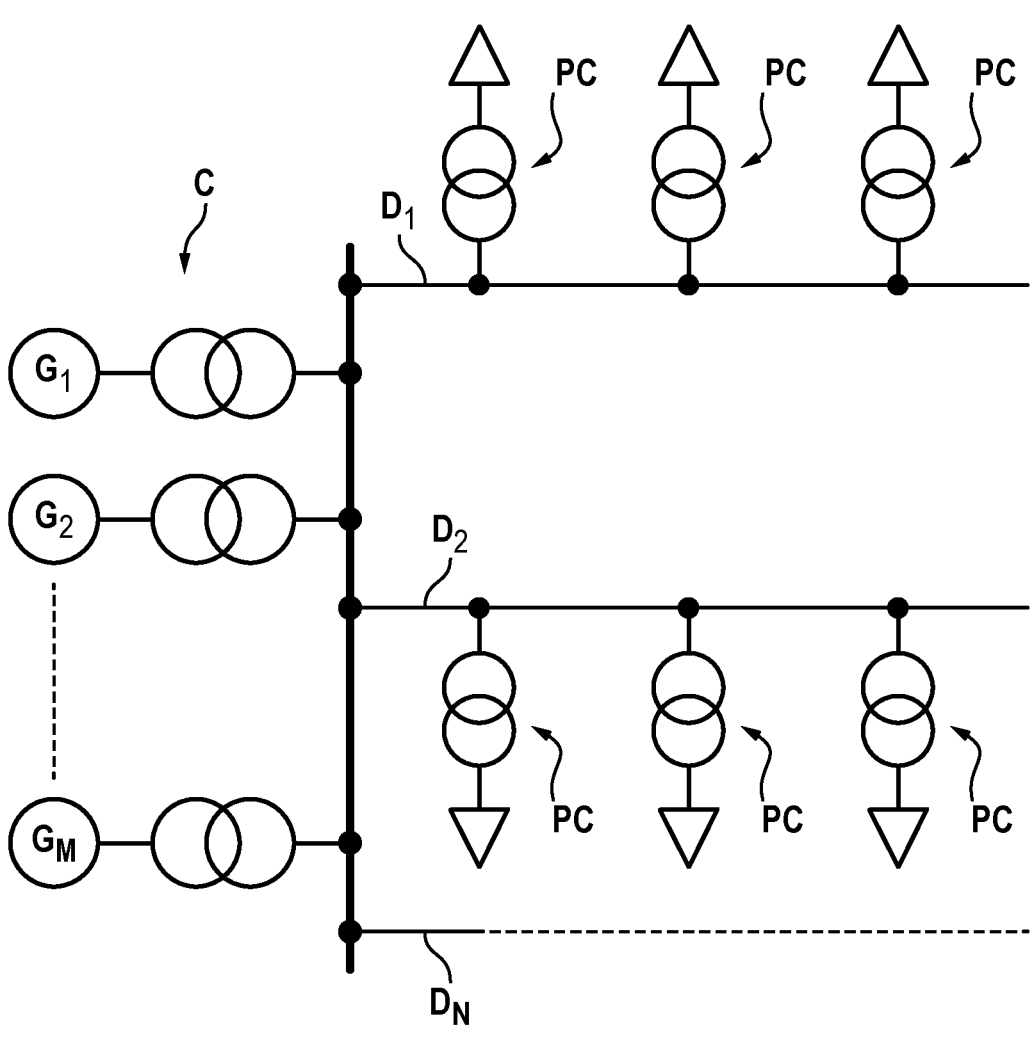
FIG. 2 shows a wiring diagram of a second type of electrical system, according to the prior art.
Figure 3:
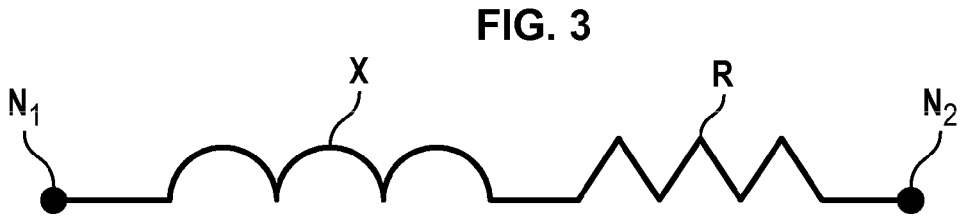
FIG. 3 is an equivalent wiring diagram of an electrical grid line of FIG. 2, according to the prior art.
Figure 4:
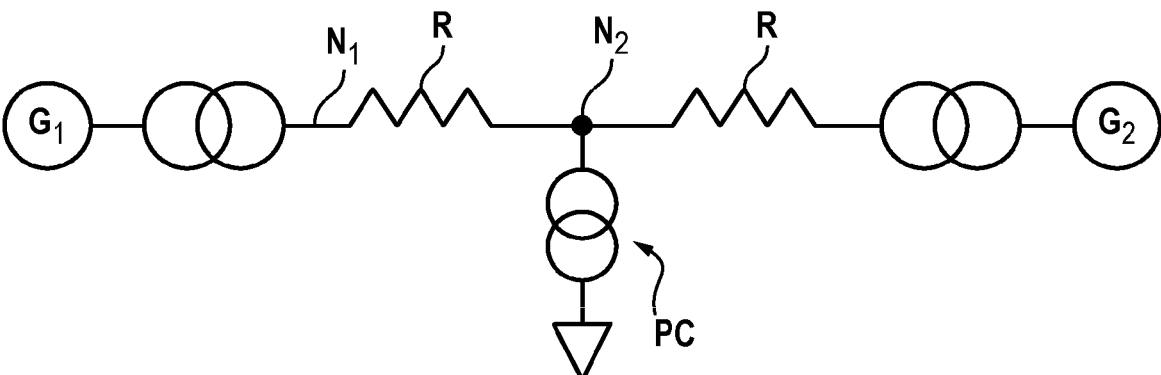
FIG. 4 is an equivalent wiring diagram of distributed production sets of a microgrid according to the prior art.
Figure 5:
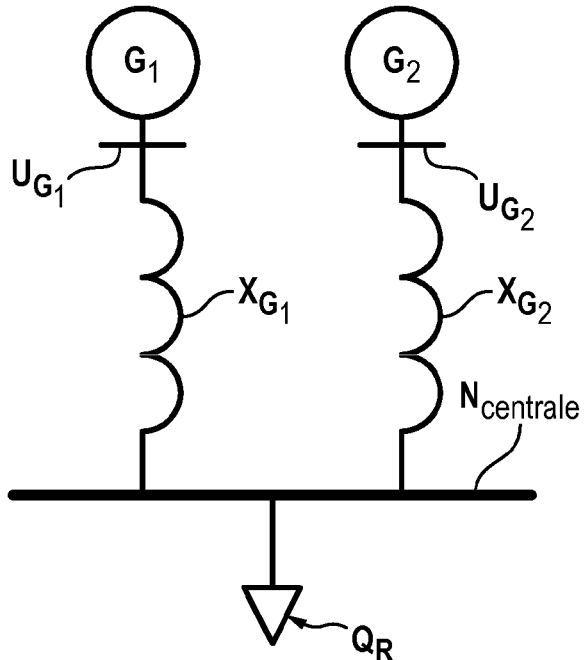
FIG. 5 is an equivalent wiring diagram of two centralized production sets of a microgrid according to the prior art.
Figure 6:
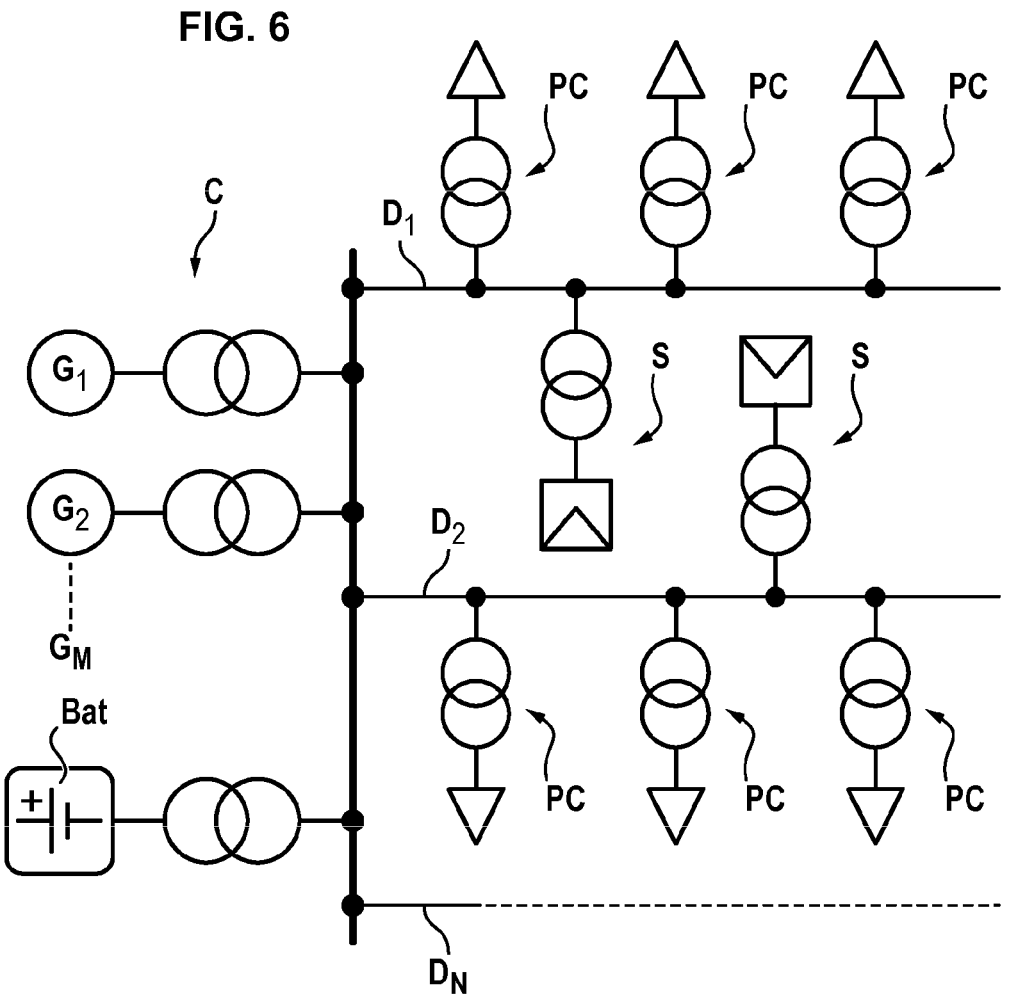
FIG. 6 shows a wiring diagram of a third type of electrical installation according to the prior art.
Figure 7:
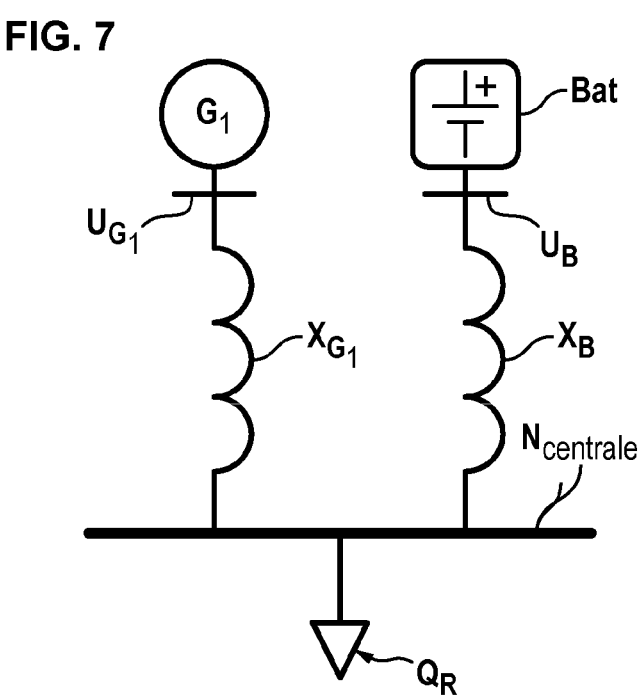
FIG. 7 is an equivalent wiring diagram of a centralized production set and storage system, according to the prior art.
Figures 8, 9:
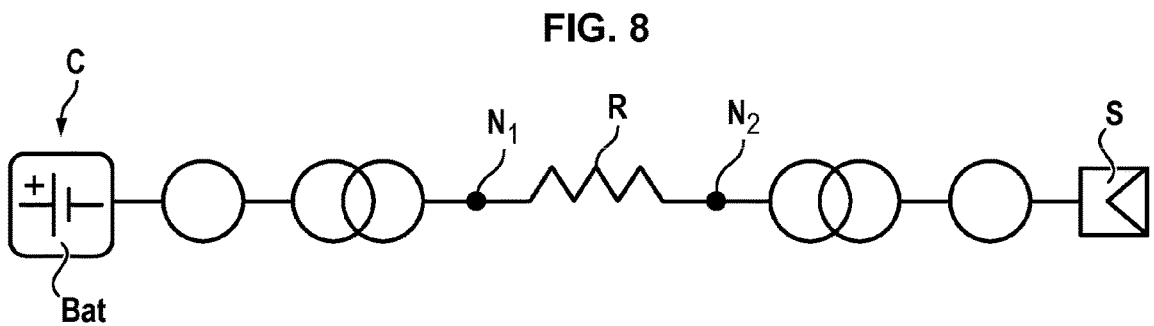
FIG. 8 is an equivalent wiring diagram of a production set and a distributed storage system of a microgrid, according to the prior art.
FIG. 9 is a wiring diagram of a microgrid requiring a control device according to embodiments of the invention.

In FIG. 9, the microgrid MR can for example include:

one (or more) electricity generation units $G_i$, such as for example two electricity generation units $G_1$ and $G_2$, each comprising one (more more) output conductors $20_i$, serving to send or receive electrical current to the electricity transmission line (or lines) $D_1$, $D_2$, ..., $D_N$, one (more more) electricity storage units Bat$_i$, each comprising one (or more) output conductors $20_i$, serving to send or receive electrical current to the line (or lines) $D_1$, $D_2$, ..., $D_N$, one (or more) connection terminals 10 (for example a common busbar, or other), jointly connected to the outlet conductor(s) $20_i$ of the electricity generation unit(s) $G_i$ and of the electricity storage unit(s) Bat$_i$, the line(s) $D_1$, $D_2$, ..., $D_N$, one end of which (outgoing line) is connected to the connection terminal(s) 10, one (or more) distributed electricity production sources $S_k$, $S_{k+1}$ (also referred to as decentralized electricity production sources $S_k$, $S_{k+1}$) along the line $D_1$, $D_2$, ..., $D_N$, one (or more) distributed electricity consumer stations $PC_l$, $PC_{l+1}$, $PC_{l+2}$ (also referred to as decentralized electricity consumer stations) $PC_l$, $PC_{l+1}$, $PC_{l+2}$ along the line $D_1$, $D_2$, ..., $D_N$.

On each outgoing electricity distribution line, for example the electricity distribution line $D_1$ as shown in FIG. 9, the distributed electricity production sources $S_k$, $S_{k+1}$ are connected to the electricity distribution line $D_1$ to be able to send it electric current and have nodes $N_{11}$, $N_{12}$ of connection to the line $D_1$, which are remote by at least a non-zero distance from one another and from the connection terminal 10 along the line $D_1$. The distributed electricity production sources $S_k$, $S_{k+1}$ can also be or comprise distributed electricity storage units $S_k$, $S_{k+1}$.

On each electricity distribution line, for example the electricity transmission line $D_1$ as shown in FIG. 9, the distributed electricity consumer stations $PC_l$, $PC_{l+1}$, $PC_{l+2}$ are connected to the electricity transmission line $D_1$ to be able to receive electric current from it and have nodes $N_{13}$, $N_{14}$, $N_{15}$ of connection to the line $D_1$, which are remote by at least a non-zero distance from one another and from the connection terminal 10 along the line $D_1$.

According to an embodiment of the invention, at least one, several or all the distributed electricity production sources $S_k$, $S_{k+1}$ may comprise, for example:

a so-called fatal, or intermittent, energy production unit, which may for example comprise one or more photovoltaic panels, one or more wind turbines, an electrical energy storage unit, which may for example comprise one or more electrical batteries (for example, this electrical energy storage unit may comprise at least one electrical battery and at least one photovoltaic panel connected to the line), one or more combustion turbine(s).

The expression "fatal energy" denotes the quantity of energy inevitably present or caught up in certain processes or products, which sometimes—at least in part—can be recovered and reused. The term "fatal" also denotes the energy that would be lost if it was not used at the time when it is available, for example: the electricity coming from wind turbines, solar panels, or that produced by the hydraulic or run-of-the-river tidal plants. The term "intermittent" denotes the fact that the unit produces energy for part of the day, such as for example one or more photovoltaic panels, or irregularly such as for example one or more wind turbines. These energy production units can use renewable energy, such as for example solar radiation for one or more photovoltaic panels, or windpower for one or more wind turbines.

The electricity generation unit(s) $G_i$, the electricity storage unit(s) $Bat_i$, the output conductor(s) $20_i$ and the connection terminal(s) 10 can be grouped into an electricity production plant. The connection terminal 10 is common to the electricity generation unit(s) $G_i$ and/or to the electricity storage unit(s) $Bat_i$, and to the output conductor(s) $20_i$, can be called the common electrical node 10 of the plant C and can for example be a common busbar of the electricity production plant C. The plant for example comprises a single common connection terminal 10 or a single common electrical node 10.

The electricity generation unit(s) $G_i$ can draw the electricity they produce from internal combustion engines, such as for example Diesel engines by way of alternators and transformers, but could also be of another type, such as for example an electricity production plant, which is nuclear or coal-based, or hydroelectric or of another type.

The electricity storage unit(s) $Bat_i$ can be or comprise one (or more) electricity storage batteries $Bat_i$, which can be equipped with an inverter.

In another example, provision can be made for only one (or more) electricity generation units $G_i$, without any electricity storage unit $Bat_i$.

In another example, provision can be made for only one (or more) electricity storage units $Bat_i$, with no electricity generation unit $G_i$.

According to the invention, the device 1000 for controlling the electricity generation unit(s) $G_i$ and/or the electricity storage unit(s) $Bat_i$ and the method for controlling the electricity generation unit(s) $G_i$ and/or the electricity storage unit(s) $Bat_i$ comprise and use the first automatic controller 100 for controlling the plant C and the second automatic controller(s) $A_i$ for controlling the electricity generation unit $G_i$ (connected to the first automatic controller 100) and/or of the electricity storage unit $Bat_i$ and is configured to compute (step E5 in FIG. 17) a setpoint voltage $U_{ref(i)}$, of each electricity generation unit $G_i$ and/or a setpoint voltage $U_{ref(i)}$, of each electricity storage unit $Bat_i$.

Below is a description, as shown in FIGS. 9 to 17, 22, 23 and 24, of what the automatic controllers 100 and $A_i$ contain for each electricity generation unit $G_i$ and/or each electricity storage unit $Bat_i$ and the steps implemented by the automatic controller 100 in the method.

The automatic controller 100 comprises a first member 1 for measuring or determining a total active power $P_{centrale}$ leaving the plant C, supplied or absorbed by the electricity generation unit(s) $G_i$ and/or the electricity storage unit(s) $Bat_i$ on the common connection terminal 10 (step E1 carried out by this first member 1). In an embodiment, the first measuring member 1 can for example be a measuring sensor on the common connection terminal 10. In another embodiment, the first measuring member 1 can use a calculator adding individual active power measurements or determinations, carried out by measuring members (sensors or other measuring members) or determining members (calculator) forming part of the second automatic controller(s) $A_i$, on the output conductor(s) $20_i$ of each electricity generation unit $G_i$ and/or each electricity storage unit $Bat_i$ to the connection terminal 10.

The automatic controller 100 comprises a second member 2 for measuring or determining a voltage $U_{Rmes}$ of the common connection terminal 10 (which can for example be a measuring sensor on the output conductor $20_i$ or on the common connection terminal in step E2 carried out by this second member 2. This voltage $U_{Rmes}$ of the common connection terminal 10 is therefore the voltage $U_{Rmes}$ of the output conductor(s) $20_i$ of each electricity generation unit $G_i$ and/or of each electricity storage unit $Bat_i$.

The common connection terminal 100 comprises a third computing member 3 (for example a calculator) of a voltage reference $U_{centraleRef}$ of the common connection terminal according to a first prescribed function f depending at least on the total active power $P_{centrale}$ (step E3 carried out by this third member 3).

Each second automatic controller comprises a fourth member $4_i$ for measuring or determining an individual reactive power $Q_{mes(i)}$ supplied or absorbed by the electricity generation unit $(G_i)$ associated with this second automatic controller $(A_i)$ and/or the electricity storage unit $(Bat_i)$ associated with this second automatic controller $(A_i)$ toward the common connection terminal 10 (step E4 carried out by this fourth member 4). In an embodiment, the fourth measuring member $4_i$ can for example be a measuring sensor on the output conductor $20_i$ of each electricity generation unit $G_i$ and/or of each electricity storage unit $Bat_i$ to the connection terminal 10.

The automatic controller 100 comprises a first voltage corrector 5, having a second prescribed transfer function corr. The automatic controller 100 is configured to compute (step E5)

$$U_{centraleRef} = f(P_{centrale})$$

$$U_{offset} = corr(U_{centraleRef} - U_{Rmes})$$

where $U_{offset}$ is a first central offset voltage, computed by applying the second prescribed transfer function corr of the first corrector to the difference $U_{centraleRef} - U_{Rmes}$. The automatic controller 100 is configured to compute at least one second offset voltage $U_{offset(i)}$ according to a third prescribed function $g_i$ dependent on the first central offset voltage $U_{offset}$. The automatic controller 100 is configured to transmit the second offset voltage(s) $U_{offset(i)}$ to the second automatic controller(s) $A_i$ for the electricity generation unit $G_i$ associated with this second automatic controller $A_i$ and/or for the electricity storage unit $Bat_i$ associated with this second automatic controller $A_i$.

The first central automatic controller 100 computes (step E6) and transmits (step E6) to each second automatic controller $A_i$ the offset voltage $U_{offset(i)}$ of each electricity generation unit $G_i$ and/or each electricity storage unit $Bat_i$ associated with this second automatic controller $A_i$ so that the voltage of the common connection terminal 10 is set to the voltage reference $U_{centraleRef}$.

The second automatic controller(s) $A_i$ is configured to compute (step E7) the local setpoint voltage(s) $U_{ref(i)}$ for the electricity generation unit $G_i$ associated with this second automatic controller $A_i$ and/or for the electricity storage unit $Bat_i$ associated with this second automatic controller ($A_i$), according to $U_{ref(i)} = U_{offset(i)} - K_{UQ(i)} - Q_{mes(i)}$ where $K_{UQ(i)}$ is a prescribed, non-zero coefficient.

According to an embodiment of the invention, each coefficient $K_{UQ(i)}$ represents a sharing function of the first total reactive power $Q_{mes}$ and can correspond to the ratio of the individual reactive power $Q_{mes(i)}$ of an electricity generation unit $G_i$ or electricity storage unit $Bat_i$ with respect to the first total reactive power $Q_{mes}$, this sharing function being implemented in the second automatic controller(s) $A_i$. This sharing function of the first total reactive power $Q_{mes}$ is associated with the regulation of the inner voltage of each electricity generation unit $G_i$ and/or each electricity storage unit $Bat_i$, carried out by the second automatic controller $A_i$ associated with this unit.

Figure 11:
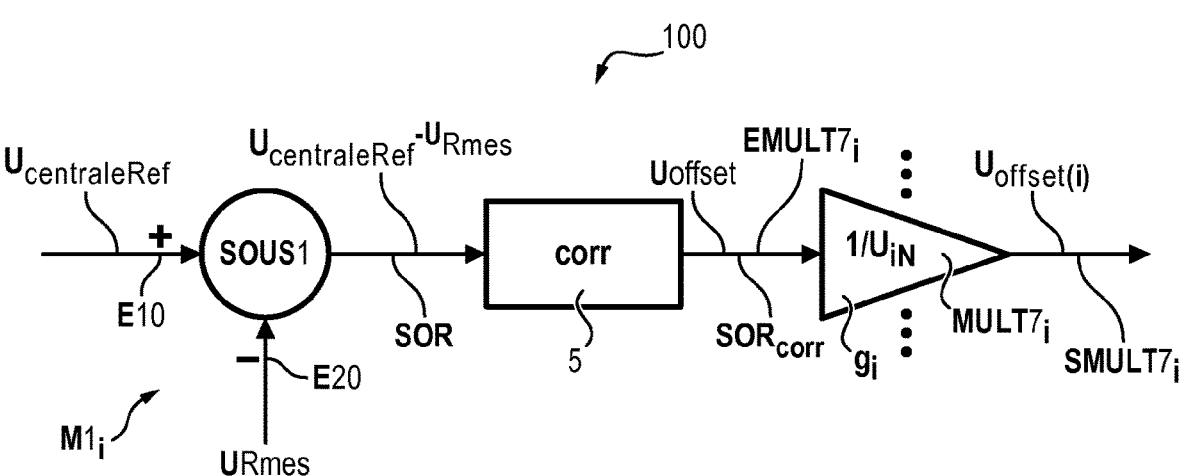
FIG. 11 is a diagram of the control device according to embodiments of the invention.

This invention makes it possible to adapt the operation of the secondary centralized voltage control presented in FIG. 11 in order to minimize voltage deviations over all the nodes of the microgrid MR, particularly the nodes $N_{11}$, $N_{12}$ of connection of the distributed electricity production sources $S_k$, $S_{k+1}$ and nodes $N_{13}$, $N_{14}$, $N_{15}$ of connection of the distributed electricity consumption plant $PC_l$, $PC_{l+1}$, $PC_{l+2}$, with respect to the nominal voltage. The voltage reference $U_{centraleRef}$ of the secondary control is modulated as a function of the total active power $P_{centrale}$ and/or of the first total reactive power $Q_{mes}$ injected by the plant C over the microgrid MR.

Figure 10:
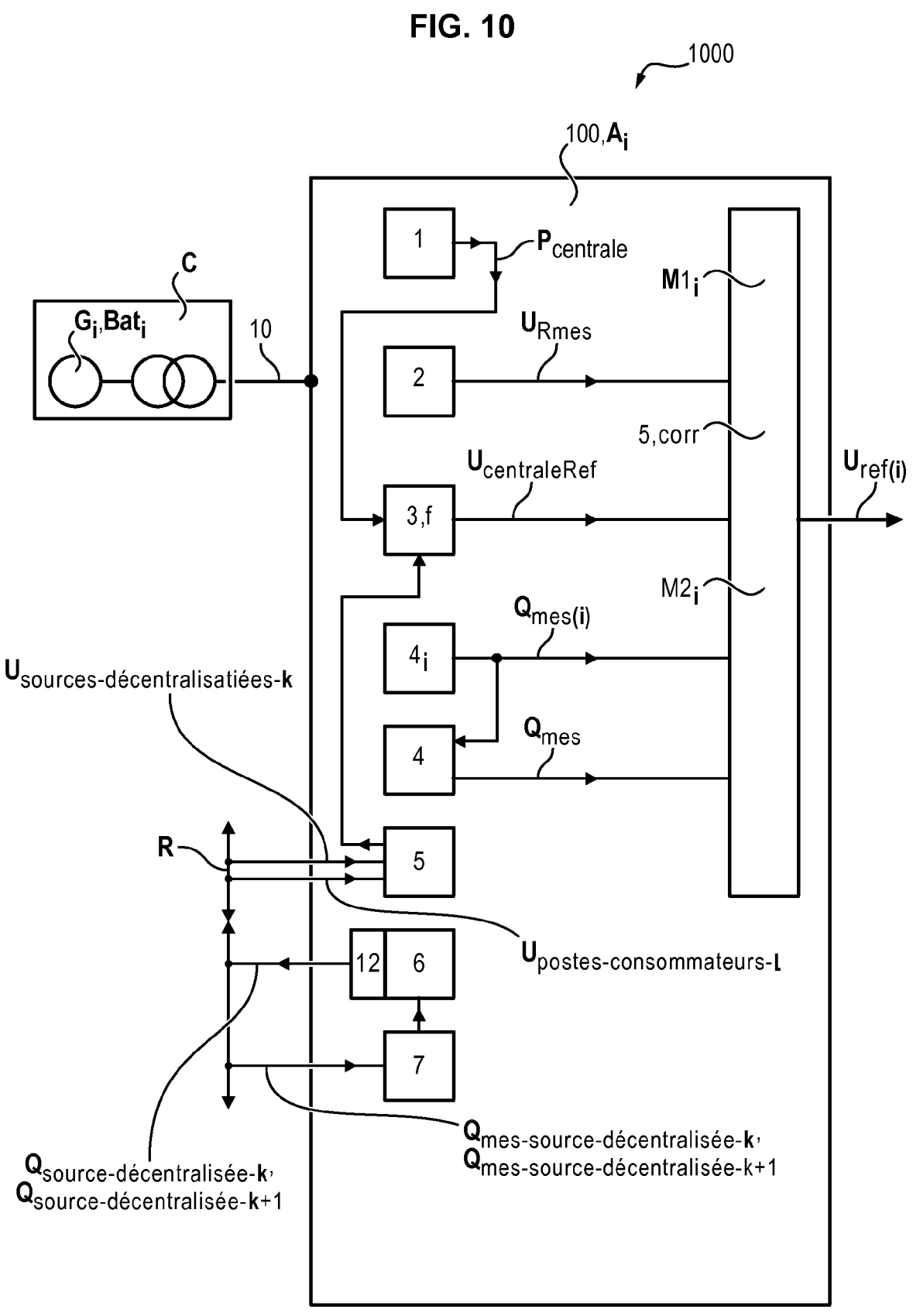
FIG. 10 is a diagram of the control device according to embodiments of the invention.
Figure 24:
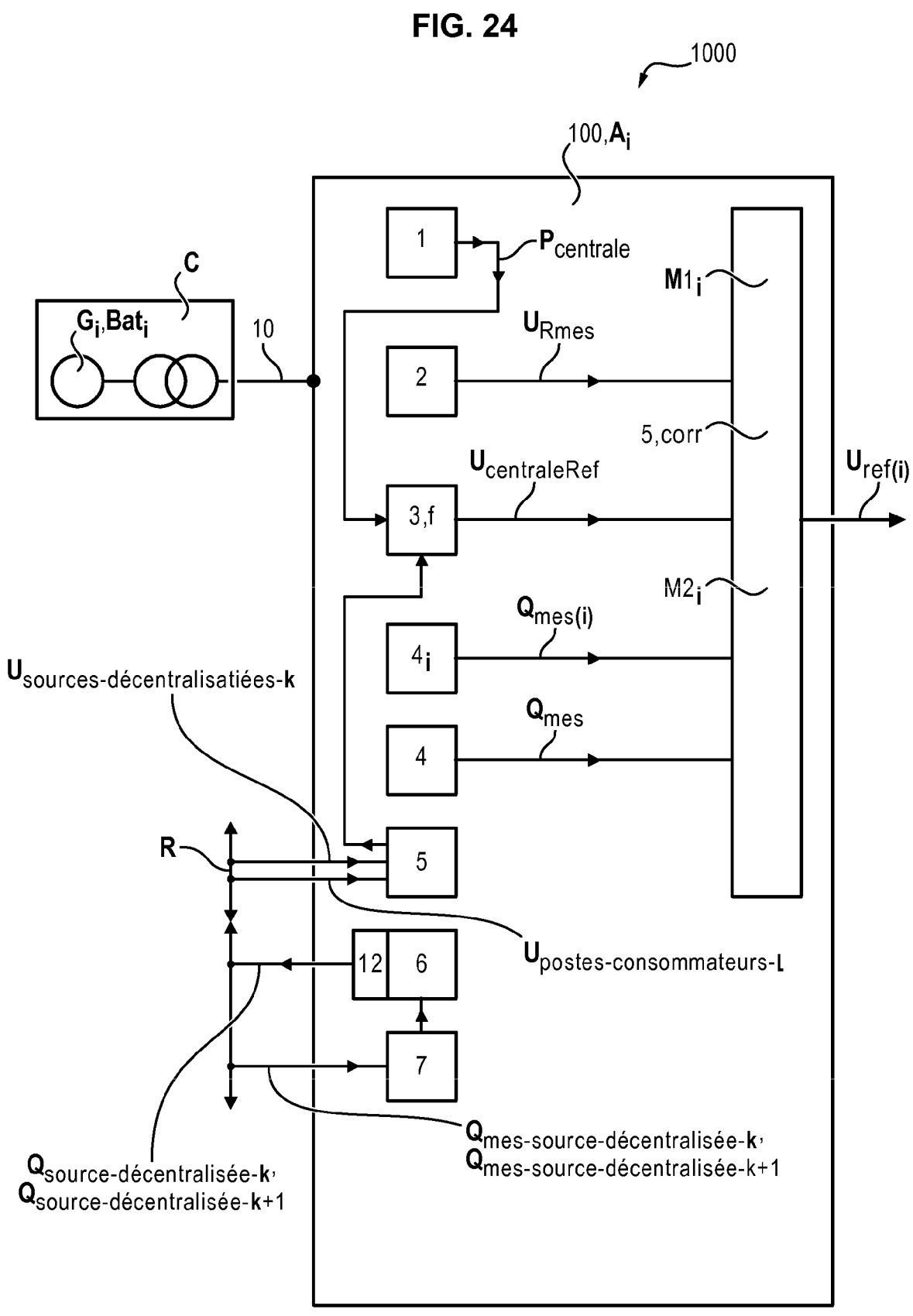
FIG. 24 is a diagram of the control device according to embodiments of the invention.

In embodiments of the invention, shown in FIGS. 10 and 24, the first central automatic controller 100 comprises another member 4 for measuring or determining the first total reactive power $Q_{mes}$ leaving the plant C, supplied or absorbed by the electricity generation unit $G_i$ and/or the electricity storage unit $Bat_i$.

In an embodiment of the invention, shown in FIG. 10, the measuring member 4 can use a calculator adding measurements or determinations of individual reactive powers $Q_{mes}$ $(i)$, which have been carried out by the members $4_i$ for measuring (sensors or others) or determining members (calculator) forming part of the second automatic controller(s) $A_i$, on the output conductor(s) $20_i$ of each electricity generation unit $G_i$ and/or of each electricity storage unit $Bat_i$ to the connection terminal 10.

In an embodiment of the invention, shown in FIG. 24, the first central automatic controller 100 comprises, as other member 4, another member 4 for measuring or determining the first total reactive power $Q_{mes}$ leaving the plant C, supplied or absorbed by the electricity generation unit $G_i$ and/or the electricity storage unit $Bat_i$ on the common connection terminal 10.

The automatic controller 100, the first computing module $M1_i$ and the second computing module $M2_i$, the members, the correctors, filters, limiters and other elements described below, can be embodied by any computing means, which can comprise a calculator, a computer, one or more processors, a computing circuit, a computer program or other. The invention also relates to a computer program comprising code instructions for implementing the method for controlling at least one electricity generation unit $G_i$ and/or at least one electricity storage unit $Bat_i$, when it is executed by the automatic controller 100. The elements described below can implement other steps of the control method, described below.

A subject matter of the invention is a computer program comprising code instructions for implementing a method for controlling a plant (C), wherein the plant comprises at least one electricity generation unit ($G_i$) and/or at least one electricity storage unit ($Bat_i$), and at least one common connection terminal (10), which is connected to the electricity generation unit ($G_i$) and/or the electricity storage unit ($Bat_i$) and which is intended to be connected to the at least one line ($D_1$, $D_2$, $D_N$) of an electricity consumption and/or production microgrid (MR), a method in which a central automatic controller (100) for controlling the electricity generation unit ($G_i$) and/or of the unit electricity storage unit ($Bat_i$) computes (E5) and transmits at least one offset voltage $U_{offset(i)}$ of each electricity generation unit ($G_i$) and/or of each electricity storage unit ($Bat_i$) to at least a second automatic controller ($A_i$) for controlling each electricity generation unit ($G_i$) and/or electricity storage unit ($Bat_i$), so that the voltage of the common connection terminal (10) is set to a voltage reference $U_{centraleRef}$, characterized by measuring or determining (E1) by a first measuring or determining member (1) of the first central automatic controller (100) a total active power $P_{centrale}$ leaving the plant (C), supplied or absorbed by the electricity generation unit ($G_i$) and/or the electricity storage unit ($Bat_i$), measuring (E2) by a second measuring member (2) of the first central automatic controller (100) a voltage $U_{Rmes}$ of the common connection terminal (10), computing (E3) by a third computing member (3) of the first central automatic controller (100) a voltage reference $U_{centraleRef}$ of the common connection terminal (10) according to a first prescribed function f depending at least on the total active power $P_{centrale}$, measuring or determining (E4) by a fourth measuring or determining member (4$_i$) of the second automatic controller ($A_i$) a first individual reactive power $Q_{mes(i)}$ supplied or absorbed by the electricity generation unit ($G_i$) associated with this second automatic controller ($A_i$) and/or by the electricity storage unit ($Bat_i$) associated with this second automatic controller ($A_i$) to the connection terminal (10), the first central automatic controller (100) having a first voltage corrector (5), having a second prescribed transfer function corr, computing (E5) by the first central automatic controller (100)

$$U_{centraleRef}=f(P_{centrale})$$

$$U_{offset}=corr(U_{centraleRef}-U_{Rmes})$$

where $U_{offset}$ is a first central offset voltage, computed by applying the second prescribed transfer function corr of the first corrector to the difference $U_{centraleRef}-U_{Rmes}$, computing (E6) by the first automatic controller (100) the second offset voltage $U_{offset(i)}$ from the first central offset voltage $U_{offset}$ according to a third prescribed function ($g_i$) and transmitting by the first automatic controller (100) the second offset voltage $U_{offset(i)}$ to the second automatic controller ($A_i$) for the electricity generation unit (G) associated with this second automatic controller ($A_i$) and/or for the electricity storage unit ($Bat_i$) associated with this second automatic controller ($A_i$), computing (E7) by the second automatic controller ($A_i$) at least a local setpoint voltage $U_{ref}$(i) for the electricity generation unit ($G_i$) associated with this second automatic controller ($A_i$) and/or for the electricity storage unit ($Bat_i$) associated with this second automatic controller ($A_i$), according to $$U_{ref}(i)=U_{offset(i)}-K_{UQ(i)}\cdot Q_{mes(i)}$$

where $K_{UQ(i)}$, is a prescribed, non-zero coefficient, the computer program being executed by the first central automatic controller (100) and by the second automatic controller ($A_i$).

Figure 22:
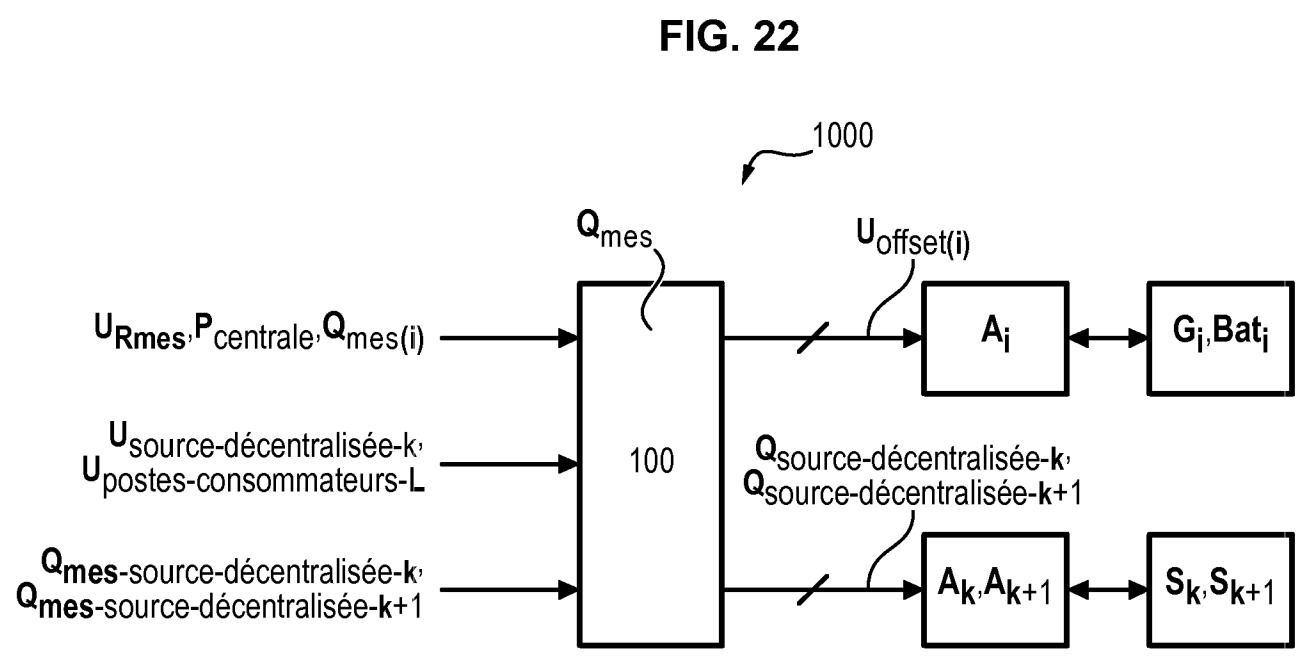
Figure 23:
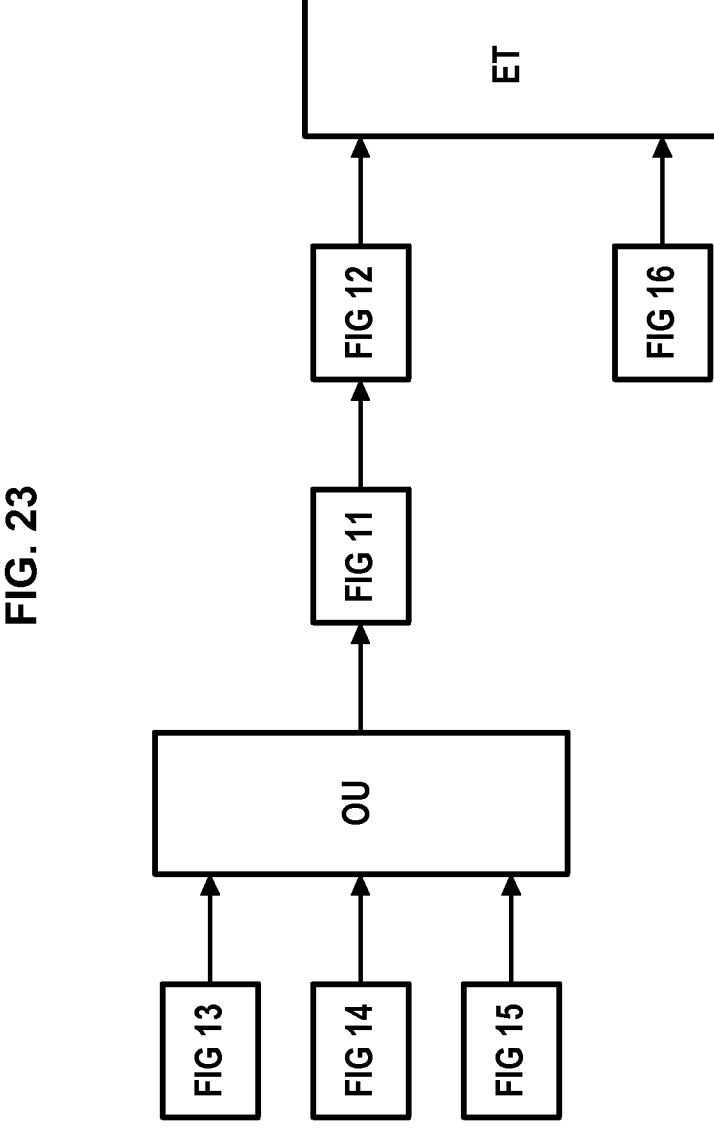
FIG. 23 shows an example of an architecture of embodiments according to the invention.

FIGS. 11, 22 and 23 shows an exemplary embodiment of a first module M1 for computing the second offset voltage $U_{offset(i)}$, in which this first computing module $M1_i$ comprises a first subtractor SOUS1 comprising a first adding input E10 receiving the voltage reference $U_{centraleRef}$ and a second subtracting input E20 receiving the voltage $U_{Rmes}$ of the common connection terminal 10 to supply on its first output SOR the difference $U_{centraleRef}-U_{Rmes}$. The output SOR is connected to the third input of the corrector 5 of the voltage regulation loop, wherein the corrector 5 computes on its second output SOR corr the offset voltage $U_{offset}$=corr ($U_{centraleRef}-U_{Rmes}$). The third prescribed function $g_i$ is or comprises the division of the first central offset voltage $U_{offset}$ by a prescribed nominal voltage $U_{iN}$ of the electricity generation unit $G_i$ and/or of the electricity storage unit $Bat_i$, for example to have the second offset voltage $U_{offset(i)}$ equal or proportional to $U_{offset(i)}=U_{offset}/U_{iN}$. The second output SOR$_{corr}$ is connected to the twenty-fourth input EMULT$7_i$ by a seventh multiplier MULT$7_i$ multiplying the first central offset voltage $U_{offset}$ by the inverse of the prescribed nominal voltage $U_{iN}$ to supply on a nineteenth output SMULT$7_i$ of the seventh multiplier MULT$7_i$ this second output voltage $U_{offset(i)}$.

Figure 12:
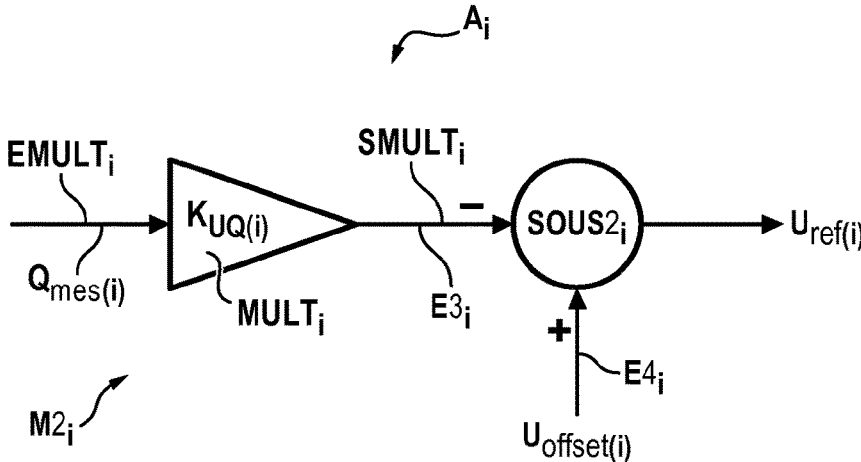
FIG. 12 is a diagram of the control device according to embodiments of the invention.

FIG. 12 shows an exemplary embodiment of a second module $M2_i$ for computing the setpoint voltage $U_{ref(i)}$, in which this second computing module $M2_i$ comprises a first multiplier MULT$_i$ comprising a fourth input EMULT$_i$ receiving the individual reactive power $Q_{mes(i)}$ and supplying on its third output SMULT$_i$ the product of the prescribed coefficient $K_{UQ(i)}$ by the individual reactive power $Q_{mes(i)}$ The output SMULT$_i$ is connected to a fifth subtractive input E$3_i$ of a second subtractor SOUS$2_i$, of which a sixth adding input E$4_i$ receives the second offset voltage $U_{offset(i)}$ and of which the fourth output SOR$_{sous2i}$, supplies the setpoint voltage $U_{ref(i)}$ equal to the difference $U_{offset(i)}-K_{UQ(i)}\cdot Q_{mes(i)}$.

Thus, $U_{offset(i)}$ is the reference voltage when the electricity generation unit $G_i$ and/or the electricity storage unit $Bat_i$ neither supplies, nor absorbs any reactive power (in the case where $Q_{mes(i)}=0$).

According to an embodiment of the invention, the first prescribed function f of the automatic controller 100 depends on at least on:

the total active power $P_{centrale}$ leaving the plant C, supplied or absorbed by the electricity generation unit $G_i$ and/or the electricity storage unit $Bat_i$ on the common connection terminal 10, and on the first total reactive power $Q_{mes}$ leaving the plant C, supplied or absorbed by the electricity generation unit $G_i$ and/or the electricity storage unit $Bat_i$ on the common connection terminal, according to $$U_{centraleRef}=f(P_{centrale},Q_{mes})$$

According to an embodiment of the invention, the first prescribed function f is affine or linear and depends:

on the total active power $P_{centrale}$ leaving the plant C, supplied or absorbed by the electricity generation unit $G_i$ and/or the electricity storage unit $Bat_i$ on the common connection terminal 10, according to $$U_{centraleRef}=K_P\cdot P_{centrale}+U_0,$$

where $K_P$ is a second prescribed non-zero coefficient, $U_0$ is a third prescribed coefficient.

Figure 13:
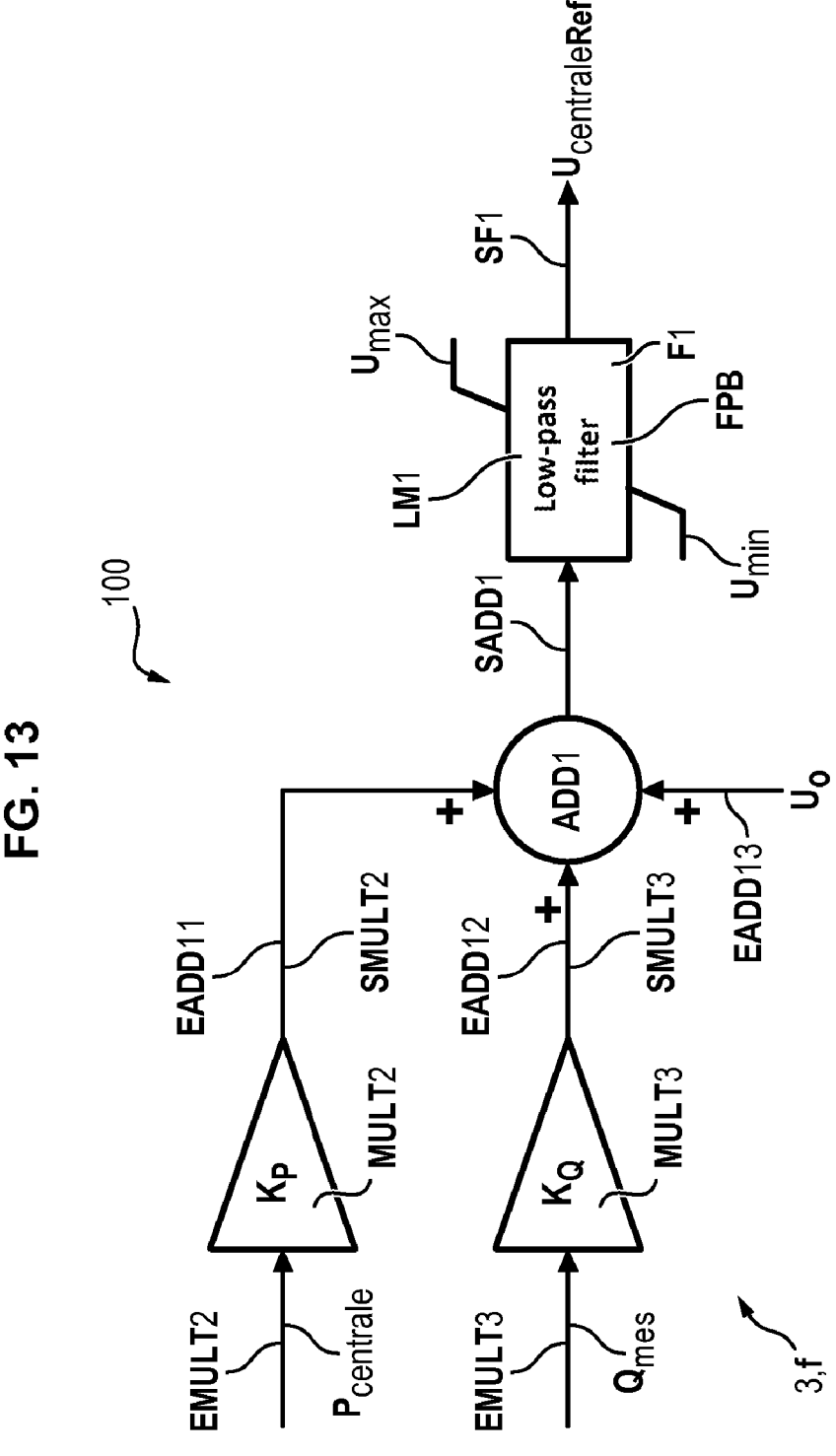
FIG. 13 is a diagram of the control device according to embodiments of the invention.
Figure 17:
FIG. 17 is a flow chart of a control method according to embodiments of the invention.
Figure 18:
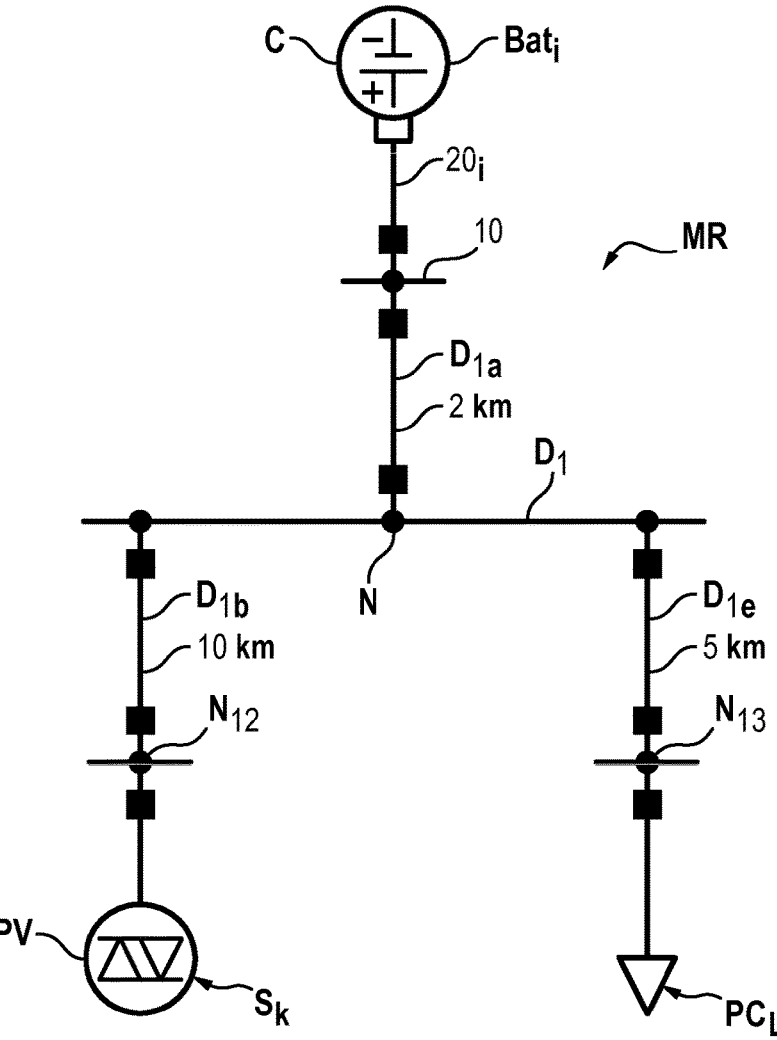
FIG. 18 illustrates an example of a microgrid tested with an example of a control device according to the prior art and with an example of a control device according to the invention.

According to an embodiment of the invention, the first prescribed function f is affine or linear and depends on:

the total active power $P_{centrale}$ leaving the plant C, supplied or absorbed by the electricity generation unit $G_i$ and/or the electricity storage unit $Bat_i$ on the common connection terminal, and on the first total reactive power $Q_{mes}$ leaving the plant C, supplied or absorbed by the electricity generation unit $G_i$ and/or the electricity storage unit $Bat_i$, on the common connection terminal, according to $$U_{centraleRef}=K_P\cdot P_{centrale}+K_Q\cdot Q_{mes}+U_0,$$

where $K_P$ is a second prescribed non-zero coefficient, $U_0$ is a third prescribed coefficient, $K_Q$ is a fourth prescribed, non-zero coefficient, as is shown by way of example in FIG. 13.

In the exemplary embodiment of FIGS. 13, 22 and 23, the third computing member 3 comprises a second multiplier MULT2 comprising a seventh input EMULT2 receiving the active power $P_{centrale}$ and supplying on its fifth output SMULT2 the product of the second prescribed coefficient $K_P$ by the active power $P_{centrale}$. The third computing member 3 comprises a third multiplier MULT3 comprising an eighth input EMULT3 receiving the reactive power $Q_{mes}$ and supplying on its sixth output SMULT3 the product of the fourth prescribed coefficient $K_Q$ by the reactive power $Q_{mes}$. The third computing member 3 comprises a first adder ADD1 comprising a ninth adding input EADD11 connected to the fifth output SMULT2, a tenth adding input EADD12 connected to the eighth input EMULT3, an eleventh input EADD13 receiving the third prescribed coefficient $U_0$, and a seventh output SADD1 supplying $K_P\cdot P_{centrale}+K_Q\cdot Q_{mes}+U_0$. The third computing member 3 comprises a first filtering member F1 comprising a twelfth input EF1 connected to the seventh output SADD1. The filtering member F1 can comprise a first limiter LIM1 limiting on the eighth output SF1 of the filtering member F1 the values $K_P\cdot P_{centrale}+K_Q\cdot Q_{mes}+U_0$ to values, which are higher than or equal to a prescribed, strictly positive minimum voltage value $U_{min}$, and which are lower than or equal to a prescribed, strictly positive maximum voltage value $U_{max}$, as voltage reference $U_{centraleRef}$. The strictly positive maximum voltage value $U_{max}$ is higher than the strictly positive minimum voltage value $U_{min}$. The filtering member F1 can comprise a first low-pass filter FPB1 supplying the values $K_P \cdot P_{centrale} + K_Q \cdot Q_{mes} + U_0$ filtered by a prescribed first low-pass filtering function on the eighth output SF1 of the filtering member F1 as voltage reference $U_{centraleRef}$. The filtering member F1 can comprise both the first limiter LIM1 and the first low-pass filter FPB1 to supply on the eighth output SF1 of the filtering member F1 the values $K_P \cdot P_{centrale} + K_Q \cdot Q_{mes} + U_0$ both limited by the first limiter LIM1 and filtered by the first low-pass filter FPB1 on the eighth output SF1 of the first limiter LIM1 as voltage reference $U_{centraleRef}$.

Figure 14:
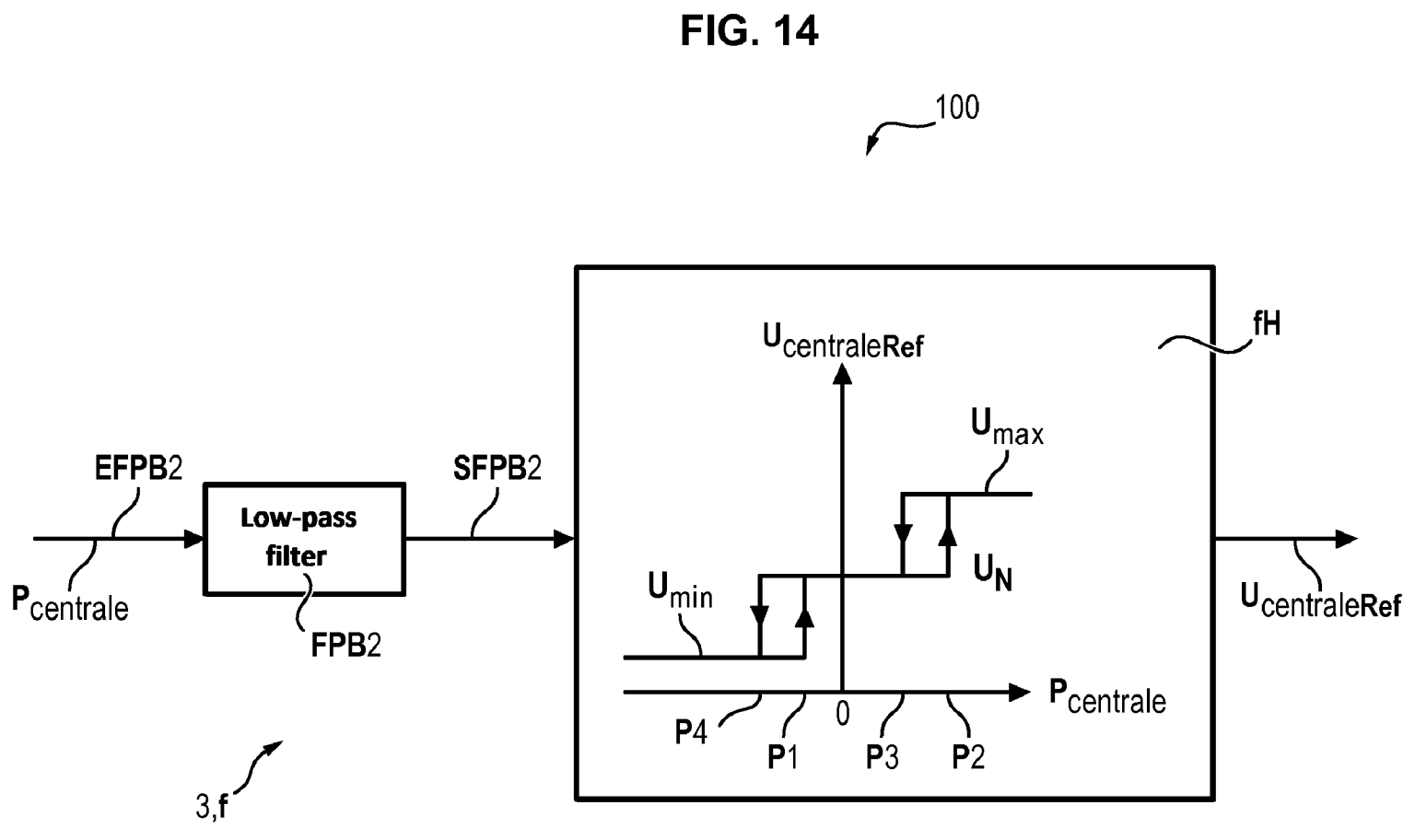

According to an embodiment of the invention, in FIGS. 14, 22 and 23, the first prescribed function f comprises a hysteresis function fH having three different voltage reference $U_{centraleRef}$ levels (namely either the prescribed minimum voltage value $U_{min}$, or the prescribed maximum voltage value $U_{max}$, or the prescribed nominal voltage value $U_N$, which is higher than the prescribed minimum voltage value $U_{min}$ and lower than the prescribed maximum voltage value $U_{max}$), according to the increasing or decreasing values of the total active power $P_{centrale}$ leaving the plant C, supplied or absorbed by the electricity generation unit $G_i$ and/or the electricity storage unit $Bat_i$ on the common connection terminal. The hysteresis function fH is useful for example if the coefficients of the linear or affine function described above were not able to be determined or if the performance is not satisfactory.

According to the hysteresis function fH, when the values of the total active power $P_{centrale}$ increase over time and become higher than or equal to a first prescribed strictly negative active power value $P_1$ while remaining lower than a second prescribed strictly positive value $P_2$ of active power, the voltage reference $U_{centraleRef}$ takes the strictly positive and prescribed nominal voltage value $U_N$ (first case).

According to the hysteresis function fH, as long as the values of the total active power $P_{centrale}$ increase over time and remain lower than the first prescribed strictly negative power value $P_1$, the voltage reference $U_{centraleRef}$ takes the strictly positive and prescribed minimum voltage value $U_{min}$ (second case).

According to the hysteresis function fH, when the values of the total active power $P_{centrale}$ increase over time and are higher than the second prescribed strictly positive active power value $P_2$, the voltage reference $U_{centraleRef}$ takes the strictly positive and prescribed maximum voltage value $U_{max}$ (third case).

According to the hysteresis function fH, when the values of the total active power $P_{centrale}$ decrease over time and become lower than or equal to a third prescribed strictly negative active power value $P_3$ while remaining higher than a fourth prescribed strictly positive active power value $P_4$, the voltage reference $U_{centraleRef}$ takes the strictly positive and prescribed nominal voltage value $U_N$ (fourth case). The first case and the fourth case for example correspond to the fact that when the injection or absorption of total active power $P_{centrale}$ is low, the fall or rise in voltage over the microgrid MR will remain limited and the secondary voltage $U_{centraleRef}$ will be maintained at its nominal value $U_N$.

According to the hysteresis function fH, when the values of the total active power $P_{centrale}$ decrease over time and are lower than the fourth prescribed strictly positive active power value $P_4$, the voltage reference $U_{centraleRef}$ takes the strictly positive and prescribed minimum voltage value $U_{min}$ (fifth case). The second case and the fifth case correspond for example to the fact that when the absorption of total active power $P_{centrale}$ is high, i.e. in the event of high production of the distributed sources $S_k$, $S_{k+1}$, the secondary voltage reference $U_{centraleRef}$ will be the low value $U_{min}$.

According to the hysteresis function fH, as long as the values of the total active power $P_{centrale}$ decrease over time and remain higher than the third prescribed strictly positive active power value $P_3$, the voltage reference $U_{centraleRef}$ takes the strictly positive and prescribed maximum voltage value $U_{max}$ (sixth case). The third case and the sixth case correspond for example to the fact that when the injection of total active power $P_{centrale}$ is high, typically during the daily consumption peak of the distributed electricity consumer stations $PC_l$, $PC_{l+1}$, $PC_{l+2}$, the secondary voltage reference $U_{centraleRef}$ will be the high value $U_{max}$.

According to an embodiment of the invention, the third prescribed strictly positive active power value $P_3$ is lower than the second prescribed strictly positive active power value $P_2$.

According to an embodiment of the invention, the fourth prescribed strictly negative active power value $P_4$ is lower than the first prescribed strictly negative active power value $P_1$.

According to an embodiment of the invention, in FIGS. 14, 22 and 23, the third computing member 3 comprises a second low-pass filter FPB2 comprising a thirteenth input EFPB2 receiving the total active power $P_{centrale}$ and supplying on its ninth output SFPB2 the total active power $P_{centrale}$ filtered by a second prescribed low-pass filtering function. The ninth output SFPB2 is connected to the hysteresis function fH which receives instead of the total active power $P_{centrale}$ the total active power $P_{centrale}$ having been filtered by a second prescribed low-pass filtering function of the second low-pass filter FPB2.

According to an embodiment of the invention, in FIGS. 10, 22, 23 and 24, the automatic controller 100 further comprises at least a receiving member 5 to receive:

first voltage remote measurement values $U_{sources\text{-}décentralisées\text{-}k}$ respectively of decentralized (or distributed) electricity production sources $S_k$, $S_{k+1}$ of the line $D_1$, $D_2$, . . . , $D_N$ of the electricity production and/or consumption microgrid MR, remote by at least a non-zero distance (connection nodes $N_{11}$, $N_{12}$) from one another and from the common connection terminal 10 of the plant C, second voltage remote measurement values $U_{postes\text{-}consommateurs\text{-}l}$ respectively of decentralized (or distributed) electricity consumer stations $PC_l$, $PC_{l+1}$, $PC_{l+2}$ of the line $D_1$, $D_2$, . . . , $D_N$ of the electricity consumption and/or production microgrid MR, remote by at least a non-zero distance (connection nodes $N_{13}$, $N_{14}$, $N_{15}$) from one another and from the common connection terminal 10 of the plant.

According to an embodiment of the invention, in FIGS. 9, 10, 22, 23 and 24, the decentralized electricity production sources $S_k$, $S_{k+1}$ can each be equipped with a seventh member $7_k$, $7_{k+1}$ for measuring (for example a measuring sensor) or determining their first respective voltage remote measurement value $U_{sources\text{-}décentralisées\text{-}k}$ and with an eighth telecommunication member $8_k$, $8_{k+1}$ (for example a transmitter) to transmit by a telecommunication network R these first voltage remote measurement values $U_{sources\text{-}décentralisées\text{-}k}$ to the fifth receiving member 5 (which is for example a telecommunications receiver).

According to an embodiment of the invention, in FIGS. 9, 10, 22, 23 and 24, the decentralized electricity consumer stations $PC_l$, $PC_{l+1}$, $PC_{l+2}$ can each be equipped with a ninth member $9_l$, $9_{l+1}$, $9_{l+2}$ for measuring (for example a measuring sensor) or determining their second respective voltage remote measurement value $U_{postes-consommateurs-l}$ and with a tenth telecommunication member $10_l$, $10_{l+1}$, $10_{l+2}$ (for example a transmitter) to transmit by a telecommunication network R these second respective voltage remote measurement values $U_{postes-consommateurs-l}$ to the fifth receiving member 5.

According to an embodiment of the invention, in FIGS. 15, 22 and 23, the first prescribed function f comprises:

computing a voltage maximum $U_{Rmax}$ of the voltage $U_{Rmes}$ of the common connection terminal (10) of the plant C and of the first voltage remote measurement values $U_{sources-décentralisées-k}$ of the decentralized electricity production sources $S_k$, $S_{k+1}$, i.e.

$$U_{Rmax} = \max(U_{Rmes}, U_{source-décentralisée-k}),$$

computing a voltage minimum $U_{Rmin}$ of the voltage $U_{Rmes}$ of the common connection terminal (10) of the plant and of the second voltage remote measurement values $U_{postes-consommateurs-l}$ of the decentralized electricity consumer stations $PC_l$, $PC_{l+1}$, $PC_{l+2}$, i.e.

$$U_{Rmin} = \min(U_{Rmes}, U_{postes-consommateurs-l}),$$

taking into account the half-sum of the voltage maximum $U_{Rmax}$ and of the voltage minimum $U_{Rmin}$ for the computation of the voltage reference $U_{centraleRef}$.

This makes it possible to take into account the lowest and the highest voltages of the distributed sources $S_k$, $S_{k+1}$ and of the distributed consumer stations $PC_l$, $PC_{l+1}$, $PC_{l+2}$ to compute the optimal voltage reference $U_{centraleRef}$. Specifically, the maximum voltage $U_{Rmax}$ on the microgrid corresponds necessarily to that of a distributed source supplying active power as per the equations of the first type mentioned above. The minimum voltage $U_{Rmin}$ on the microgrid corresponds necessarily to that of a distributed consumer station absorbing active power as per the equations of the first type mentioned above. This function, which corresponds to an external regulation loop for the secondary setting, has the objective of centering the voltage of the microgrid MR on its nominal value $U_N$. Specifically, when the second PID corrector REG has canceled out the static error of this external loop, the voltage reference $U_{centraleRef}$ makes it possible to obtain $U_{Rmax} + U_{Rmin}/2 = U_N$.

According to an embodiment of the invention, in FIGS. 15, 22 and 23, the third computing member 3 comprises a second adder ADD2 comprising a fourteenth adding input EADD21 receiving the maximum voltage $U_{Rmax}$, a fifteenth adding input EADD22 receiving the minimum voltage $U_{Rmin}$, and a tenth output SADD2 supplying the sum of the voltage maximum U Rmax and of the voltage minimum $U_{Rmin}$. The third computing member 3 comprises a fourth multiplier MULT4 comprising a sixteenth input EMULT4 connected to the tenth output SADD2 and supplying on its eleventh output SMULT4 the half-sum of the voltage maximum $U_{Rmax}$ and of the voltage minimum $U_{Rmin}$.

According to an embodiment of the invention, in FIGS. 15, 22 and 23, the third computing member 3 comprises a second corrector REG of proportional-integral-derivative (PID) type, supplying on its twelfth output SREG the voltage reference $U_{centraleRef}$ from the difference between on the one hand the prescribed nominal voltage U N and on the other hand the half-sum of the voltage maximum $U_{Rmax}$ and of the voltage minimum $U_{Rmin}$, this difference being applied to a seventeenth input EREG of the second corrector REG.

According to an embodiment of the invention, in FIGS. 15, 22 and 23, the third computing member 3 comprises a second limiter LIM2 limiting on the twelfth output SREG of the second corrector REG the voltage reference values $U_{centraleRef}$ to values which are higher than on equal to the strictly positive, prescribed minimum voltage value $U_{min}$, and which are lower than or equal to the strictly positive, prescribed maximum voltage value $U_{max}$.

According to an embodiment of the invention, in FIGS. 15, 22 and 23, the third computing member 3 comprises a second subtracter SOUS2 comprising an eighteenth adding input ESOUS21 receiving the prescribed nominal voltage $U_N$ and a nineteenth subtracting input ESOUS22 receiving the half-sum of the voltage maximum $U_{Rmax}$ and of the voltage minimum $U_{Rmin}$, to supply on its ninth output SOR2 the difference between on the one hand the prescribed nominal voltage U N and on the other hand the half-sum of the voltage maximum $U_{Rmax}$ and of the voltage minimum $U_{Rmin}$. The ninth output SOR2 is connected to the seventeenth input EREG of the second corrector REG.

According to an embodiment of the invention, in FIGS. 15, 22 and 23, the third computing member 3 can comprise a third low-pass filter FPB3, the twentieth input EFPB3 of which is connected to the eleventh output SMULT4 to receive the half-sum of the voltage maximum U Rmax and of the voltage minimum $U_{Rmin}$. The third low-pass filter FPB3 comprises a thirteenth output SFPB3 supplying the half-sum of the voltage maximum U Rmax and of the voltage minimum $U_{Rmin}$, filtered by a third prescribed low-pass filtering function. The thirteenth output SFPB3 is connected to the nineteenth subtracting input ESOUS22.

According to an embodiment of the invention, in FIGS. 9, 10, 16, 22, 23 and 24, the automatic controller 100 comprises a sixth member 6 for computing reactive power setpoints $Q_{source-décentralisée-k}$, $Q_{source-décentralisée-k+1}$ for the corresponding decentralized electricity production sources $S_k$, $S_{k+1}$. These respective setpoints $Q_{source-décentralisée-k}$, $Q_{source-décentralisée-k+1}$ are proportions $r_k$, $r_{k+1}$ at least of the first total reactive power $Q_{mes}$ leaving the plant C, supplied or absorbed by the electricity generation unit $G_i$ and/or the electricity storage unit $Bat_i$ on the common connection terminal 10 (it thus being possible to add other measured reactive powers, as described below). The automatic controller 100 can comprise a twelfth telecommunication member (for example a transmitter) to transmit by a telecommunication network R these respective setpoints $Q_{source-décentralisée-k}$, $Q_{source-décentralisée-k+1}$ to the corresponding decentralized electricity production sources $S_k$, $S_{k+1}$ (which can have a thirteenth receiving member $13_k$, $13_{k+1}$ (for example, a telecommunication receiver)) receiving these respective setpoints $Q_{source-décentralisée-k}$, $Q_{source-décentralisée-k+1}$ by the telecommunication network R on their third automatic controller A k. The third automatic controller $A_k$, $A_{k+1}$ of each decentralized electricity production source $S_k$, $S_{k+1}$ regulates the internal voltage of this decentralized electricity production source $S_k$, $S_{k+1}$.

According to an embodiment of the invention, in FIGS. 9, 10, 16, 22, 23 and 24, the automatic controller 100 comprises a seventh receiving member 7 for receiving third reactive power remote measurement values $Q_{mes-source-décentralisée-k}$, $Q_{mes-source-décentralisée-k+1}$ of the respective decentralized electricity production sources $S_k$, S k+1. The sixth computing member 6 is configured to compute a second total reactive power $Q_{microréseau}$ equal to the algebraic sum SPR of the first total reactive power $Q_{mes}$ leaving the plant C, supplied or absorbed by the electricity generation unit $G_i$ and/or the electricity storage unit $Bat_i$ on the common connection terminal 10 and of the third reactive power remote measurement values $Q_{mes-source-décentralisée-k}$, $Q_{mes-source-décentralisée-k+1}$ (absorbed or injected) of the respective distributed electricity production sources $S_k$, $S_{k+1}$. The sixth computing member 6 is configured to compute the reactive power setpoints $Q_{source-décentralisée-k}$, $Q_{source-décentralisée-k+1}$ of the respective decentralized electricity production sources $S_k$, $S_{k+1}$ as proportions $r_k$, $r_{k+1}$ of said sum SPR, $Q_{microréseau}$ i.e.

$$Q_{source-décentralisée-k} = r_k \cdot Q_{microréseau},$$

$$Q_{source-décentralisée-k+1} = r_{k+1} \cdot Q_{microréseau},$$

with $0 \leq r_k \leq 1$, $0 \leq r_{k+1} \leq 1$, and the sum of the $r_k$, $r_{k+1}$ being equal to 1.

This allows the effective participation of the distributed electricity production sources $S_k$, $S_{k+1}$ in the supply of reactive power. By default, the entirety of the reactive power $Q_{mes(i)}$ will be supplied or absorbed by the electricity generation unit $G_i$ and/or the electricity storage unit $Bat_i$.

According to an embodiment of the invention, in FIGS. 9, 10, 22, 23 and 24, the decentralized electricity production sources $S_k$, $S_{k+1}$ can each be equipped with an eleventh member $\mathbf{11}_k$, $\mathbf{11}_{k+1}$ for measuring (for example a measuring sensor) or determining their third reactive power remote measurement value $Q_{mes-décentralisée-k}$, $Q_{mes-décentralisée-k+1}$ and an eighth telecommunication member $\mathbf{8}_k$, $\mathbf{8}_{k+1}$ (for example a transmitter) to transmit by a telecommunication network R these third reactive power remote measurement values $Q_{mes-source-décentralisée-k}$, $Q_{mes-source-décentralisée-k+1}$ to the seventh receiving member 7 (which has for example a telecommunication receiver.)

Figure 16:
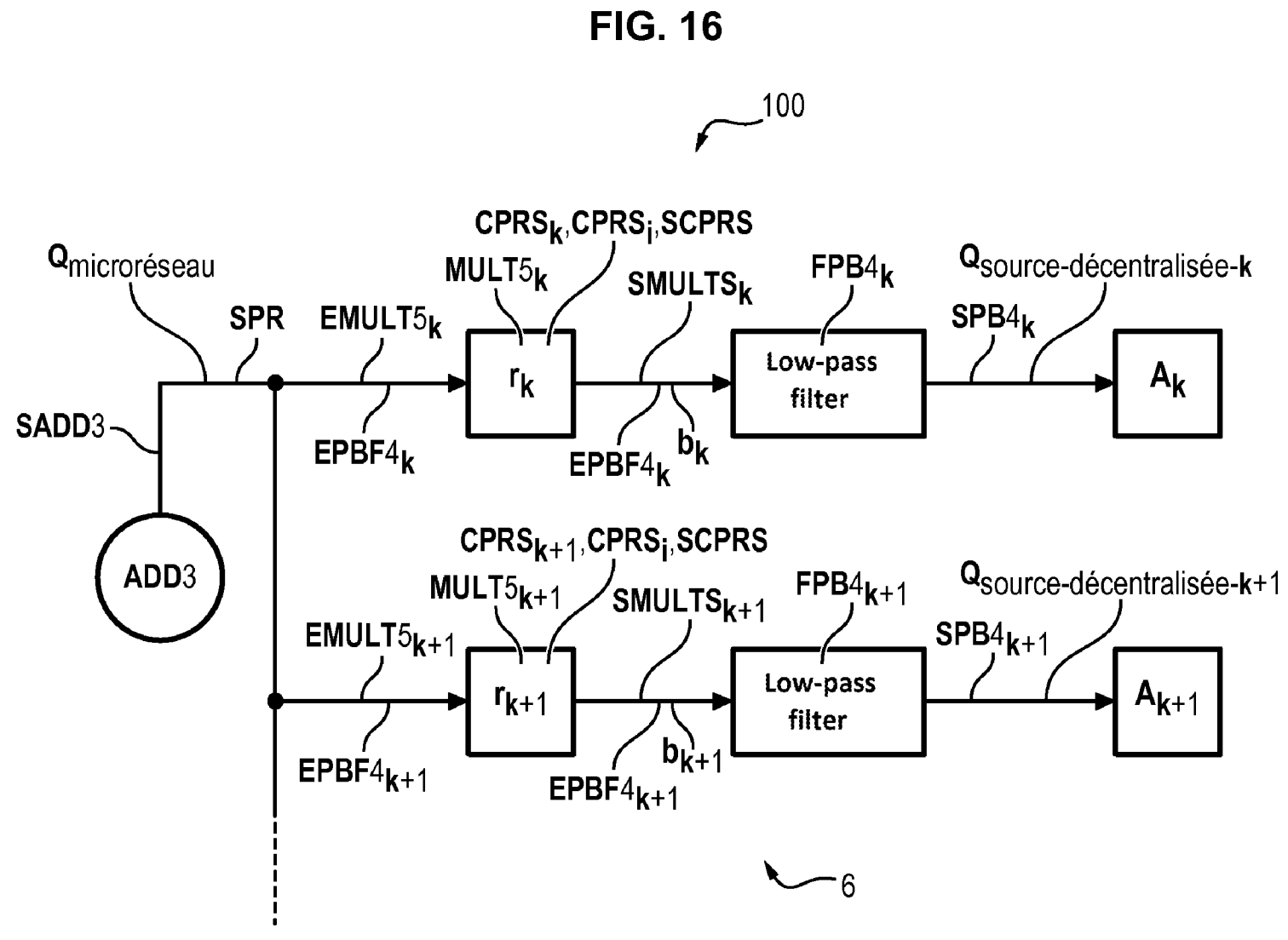

According to an embodiment of the invention, in FIGS. 16, 22 and 23, the proportions $r_k$, $r_{k+1}$ in the reactive power setpoints $Q_{source-décentralisée-k}$, $Q_{source-décentralisée-k+1}$ of the respective distributed electricity production sources $S_k$, $S_{k+1}$ correspond to respective ratios $r_k$, $r_{k+1}$ of a prescribed reactive power capacity $CPRS_k$, $CPRS_{k+1}$ of the respective distributed electricity production source $S_k$, $S_{k+1}$, divided by the sum SCPRS of the respective prescribed active power capacities $CPRS_k$, $CPRS_{k+1}$ of the respective distributed electricity production sources $S_k$, $S_{k+1}$ and of the respective prescribed active power capacities $CPRS_i$ of the electricity generation unit(s) $G_i$ and/or of the electricity storage unit(s) $Bat_i$, i.e.

$$r_k = CPRS_k / SCPRS,$$

$$r_{k+1} = CPRS_{k+1} / SCPRS.$$

According to an embodiment of the invention, in FIGS. 16, 22 and 23, the sixth computing member 6 comprises a third adder ADD3 receiving on its inputs the first total reactive power $Q_{mes}$ leaving the plant C, supplied or absorbed by the electricity generation unit $G_i$ and/or the electricity storage unit $Bat_i$ on the common connection terminal 10 and the third reactive power remote measurement values $Q_{mes-source-décentralisée-k}$, $Q_{mes-source-décentralisée-k+1}$, and comprising a fourteenth output SADD3 supplying the algebraic sum SPR of the first total reactive power $Q_{mes}$ leaving the plant C, supplied or absorbed by the electricity generation unit $G_i$ and/or the electricity storage unit $Bat_i$ on the common connection terminal 10 and of the third reactive power remote measurement values $Q_{mes-source-décentralisée-k}$, $Q_{mes-source-décentralisée-k+1}$ (absorbed or injected) of the respective distributed electricity production sources $S_k$, $S_{k+1}$. The sixth computing member 6 comprises respective branches $b_k$, $b_{k+1}$ for computing the reactive power setpoints $Q_{source-décentralisée-k}$, $Q_{source-décentralisée-k+1}$ of the respective distributed electricity production sources $S_k$, $S_{k+1}$. Each respective computing branch b k comprises a fifth multiplier $MULT5_k$ comprising a twenty-first input $EMULT5$ k connected to the fourteenth output SADD3 and supplying on its fifteenth output SMULT5 k the product $r_k \cdot SPR$. Each respective computing branch $b_{k+1}$ comprises a sixth multiplier $MULT5_{k+1}$ comprising a twenty-second input $EMULT5_{k+1}$ connected to the fourteenth output SADD3 and supplying on its sixteenth output $SMULT5_{k+1}$ the product $r_{k+1} \cdot SPR$. The sixth computing member 6 can comprise a fourth low-pass filter $FPB4_k$ of which the twenty-second input $EFPB4_k$ is connected to the fifteenth output $SMULT5_k$ to receive the product $r_k \cdot SPR$. The fourth low-pass filter $FPB4_k$ comprises a seventeenth output $SFPB4_k$ supplying the product $r_k \cdot SPR$, filtered by a fourth prescribed low-pass filtering function as respective reactive power setpoint $Q_{source-décentralisée-k}$ of the respective distributed electricity production source $S_k$. The sixth computing member 6 can comprise a fifth low-pass filter $FPB4_{k+1}$ of which the twenty-third input $EFPB4_{k+1}$ is connected to the sixteenth output $SMULT5_{k+1}$ to receive the product $r_{k+1} \cdot SPR$. The fifth low-pass filter $FPB4_{k+1}$ comprises an eighteenth output $SFPB4_{k+1}$ supplying the product $r_{k+1} \cdot SPR$, filtered by a fifth prescribed low-pass filtering function as respective reactive power setpoint $Q_{source-décentralisée-k+1}$ of the respective distributed electricity production source $S_{k+1}$.

FIG. 23 illustrates an architecture of the embodiments of the invention of FIGS. 11 to 16, comprising the embodiment of FIG. 13 or the embodiment of FIG. 14 or the embodiment of FIG. 15 (OR function in FIG. 23), combined with the embodiment of FIG. 11, with the embodiment of FIG. 12 and with the embodiment of FIG. 16 (AND function in FIG. 23).

Figure 19:
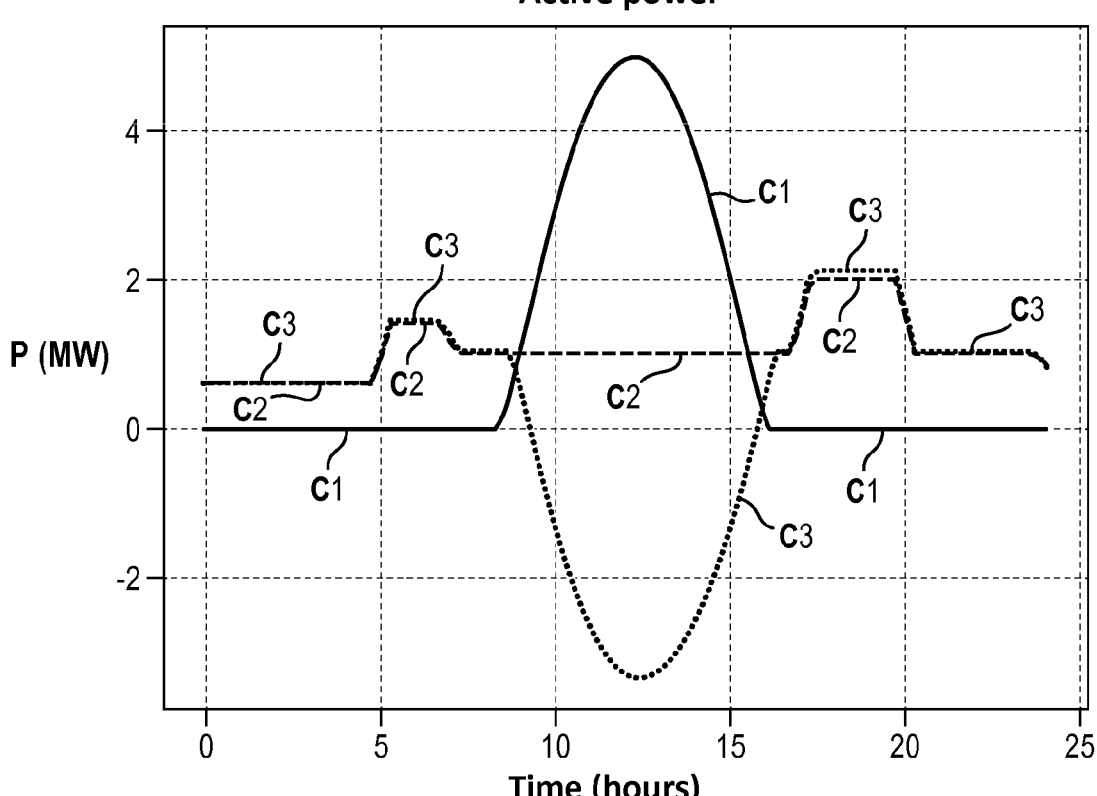
FIG. 19 shows active power profiles of the microgrid of FIG. 18.

FIGS. 18 to 21 illustrate an rms value computer simulation of an example of a microgrid MR, the plant C of which comprises an electricity storage unit $Bat_i$ formed by a battery $Bat_i$, the output conductor $\mathbf{20}_i$ of which is connected to the common connection terminal 10, itself connected by a first section of $D_{1a}$ of 2 km in length of the electricity transmission line $D_1$ to a node N, which is connected by a second section $D_{1b}$ of 10 km in length of the electricity transmission line $D_1$ to the respective distributed electricity production source $S_k$ of photovoltaic type (PV) and is connected by a third section $D_{1c}$ of km in length of the electricity transmission line $D_1$ to the decentralized electricity consumer station $PC_l$. The nominal voltage $U_{N(i)}$ of the microgrid MR is of 20 kV. The installed power of this respective decentralized electricity production source $S_k$ of photovoltaic type (PV) is of 5 MW. The load (Pn/cos(phin)) of this decentralized electricity consumer station $PC_l$ is of 2 MW/0.9. These sections $D_{1a}$, $D_{1b}$, $D_{1c}$ of the electricity transmission line $D_1$ are cables of *Phlox* 37.7 $mm^2$ (R/X) type of 1.176 Ohms/km/0.399 Ohms/km. This battery $Bat_i$ has unlimited energy and power during the simulations. FIG. 19 shows, over time along the abscissae, the profile of the active power (curve C1) of the decentralized electricity production source $S_k$ of photovoltaic type (PV), the profile of the active power (curve C2) of the decentralized electricity consumer station $PC_l$ and the profile of the active power (curve C3) of the battery $Bat_i$.

Figure 20:
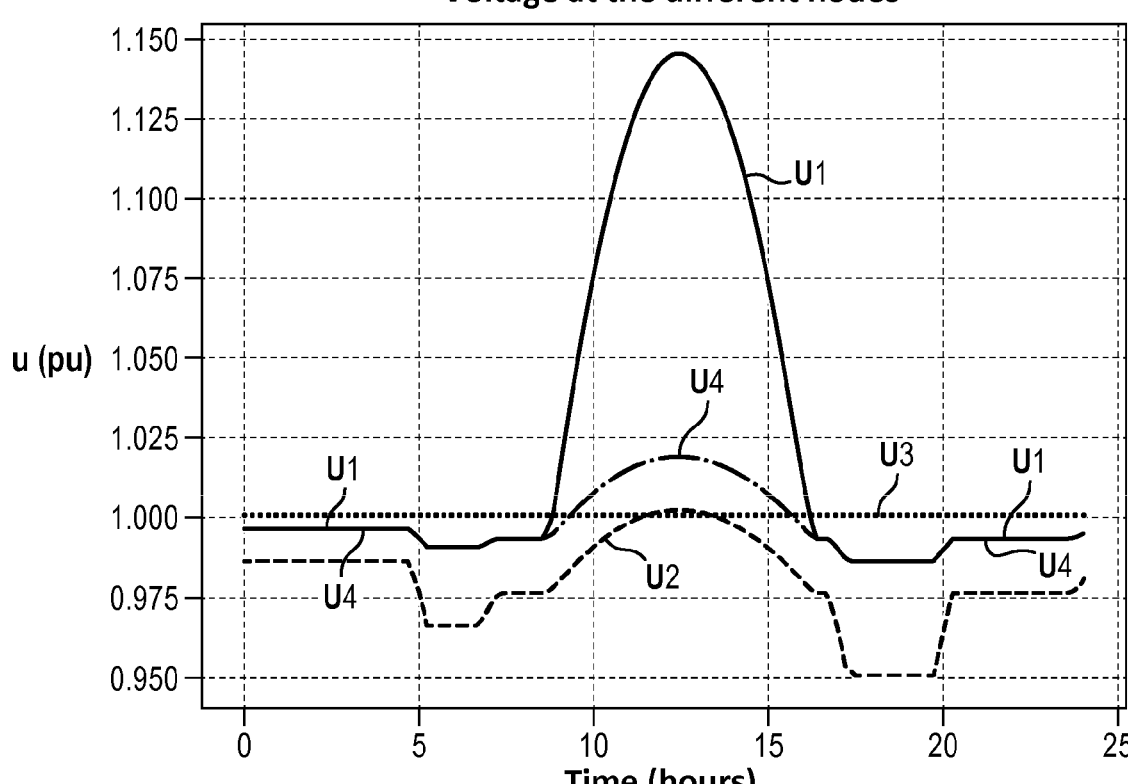
FIG. 20 shows voltage curves of the microgrid tested with an example of a control device according to the prior art.
Figure 21:
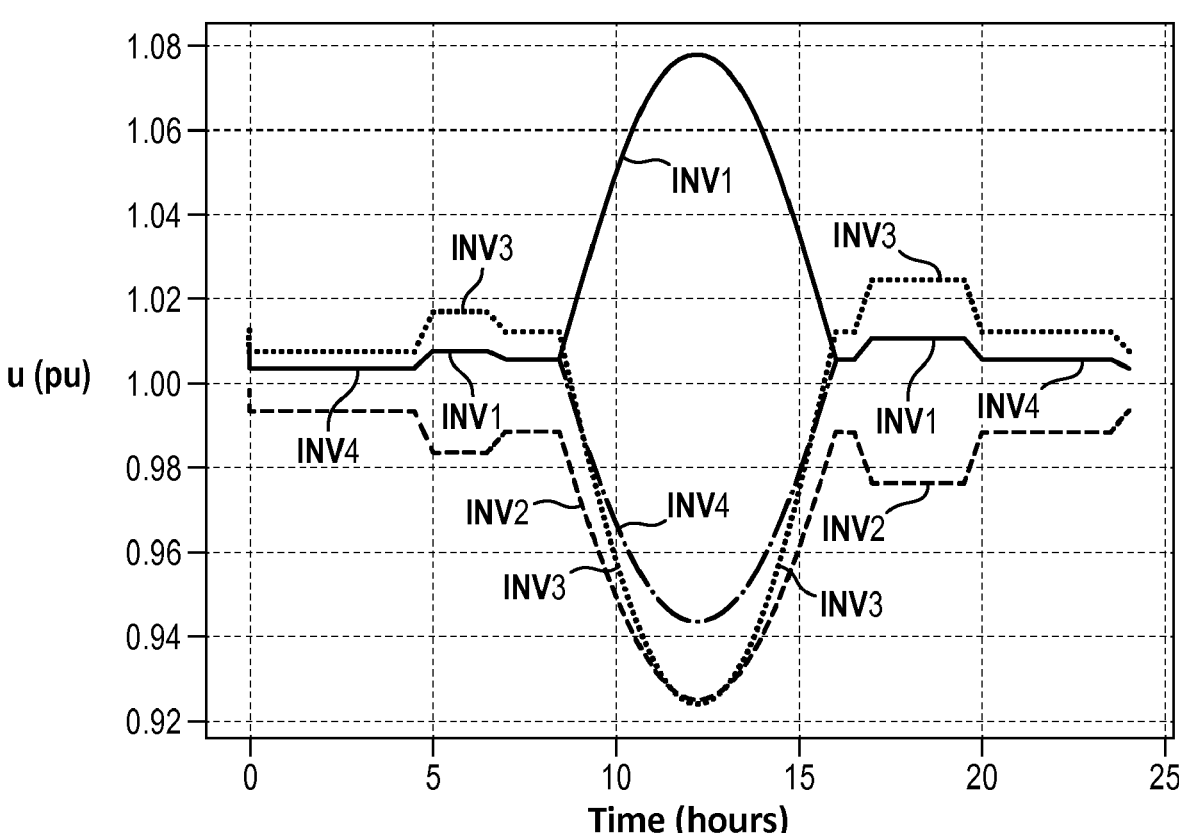
FIG. 21 shows voltage curves of the microgrid tested with an example of a control device according to the invention.

Two scenarios have been simulated and compared: the first scenario of FIG. 20 in which the voltage of the plant C is kept at its nominal value U N by the battery Bat$_i$ via a known centralized secondary control algorithm and the second scenario of FIG. 21 using the present invention in which the voltage reference U$_{centraleRef}$ of the secondary setting is computed via the first affine prescribed function U$_{centraleRef}$=K$_P$β$_{centrale}$+K$_Q$·Q$_{centrale}$+U$_0$, described above, with in this example K$_P$=0.392 kV/MW, K$_Q$=−0.385 kV/Mvar and U$_0$=20 kV.

FIG. 20 shows, over time along the abscissae, the voltage at the node N$_{12}$ (curve U$_1$) of the respective decentralized electricity production source S$_k$ of photovoltaic type (PV), the voltage at the node N$_{13}$ (curve U2) of the decentralized electricity consumer station PC$_l$, the voltage on the connection terminal 10 (curve U3) of the battery Bat$_i$ and the voltage of the common node N (curve U4) in the first scenario. In FIG. 20, the ordinate voltage is expressed as a reduced value (u(pu)) corresponding to U/20 kV.

FIG. 21 shows, over time on the abscissae, the voltage of the node N12 (curve INV1) of the respective decentralized electricity production source S$_k$ of photovoltaic type (PV), the voltage at the node N13 (curve INV2) of the decentralized electricity consumer station PC$_l$, the voltage on the connection terminal 10 (curve INV3) of the battery Bat$_i$ and the voltage of the common node N (curve INV4) in the first scenario according to the invention. In FIG. 20, the voltage on the ordinate is expressed as a reduced value (u(pu)) corresponding to U/20 kV.

One observes for the first scenario of FIG. 20 that, although the voltage of the battery Bat$_i$ of the plant C according to the curve U3 is ideally kept at its nominal value U$_N$, this is not the case for the other nodes N$_{12}$, N$_{13}$, N of the network on the curves U1, U2 and U4. The voltage of the curve U1 of the node N12 corresponding to the respective decentralized electricity production source S$_k$ of photovoltaic (PV) type is the perfect example thereof, with a voltage rise near to 15% during the production peak of this source PV. In a less impressive but nonetheless noteworthy manner, the voltage of the curve U2 at the node N$_{13}$ corresponding to the decentralized electricity consumer station PC$_l$ falls significantly during the consumption peak between 17 and 19 hours.

In FIG. 21, the second scenario according to the invention meanwhile makes it possible, in accordance with the goal of this invention, to minimize the voltage variations over the whole of the network by modulating the voltage (curve INV3) of the plant C comprising the battery Bat$_i$ (terminal 10). The voltage (curve INV3) of the plant C comprising the battery Bat$_i$ (terminal 10) is significantly lowered to limit the rise in the voltage (curve INV1) at the node N 12 to approximately 8%, i.e. nearly twice as low as the curve U1 in the first scenario, during the production peak of the respective decentralized electricity production source S k of photovoltaic (PV) type and, conversely, the voltage (curve INV3) of the plant C comprising the battery Bat$_i$ (terminal 10) is increased to limit the fall in the voltage at the node N 13 during the consumption peak (curve INV2 between 17 and 19 hours) of the decentralized electricity production source PC$_l$.

Of course, the embodiments, features, possibilities and examples described above can be combined with one another or be selected independently of one another.

The invention claimed is:

1. A device for controlling a plant, wherein the plant comprises at least one electricity generation unit and/or at least one electricity storage unit, and at least one common connection terminal, wherein the at least one common connection terminal is connected to the at least one electricity generation unit and/or to the at least one electricity storage unit and to at least one line of an electricity consumption and/or production microgrid, the control device comprising at least one first central automatic controller and at least one second automatic controller for each at least one electricity generation unit and/or electricity storage unit, the at least one second automatic controller being connected to the at least one first central automatic controller, the at least one first central automatic controller being configured to compute and transmit to the at least one second automatic controller at least one second offset voltage U$_{offset(i)}$ of each at least one electricity generation unit and/or of each at least one electricity storage unit, so that a voltage of the at least one common connection terminal is set to a voltage reference U$_{centraleRef}$, wherein the at least one first central automatic controller comprises a first member for measuring or determining a total active power P$_{centrale}$ of the plant, supplied or absorbed by the at least one electricity generation unit and/or the at least one electricity storage unit, a second member for measuring or determining a voltage U$_{Rmes}$ of the at least one common connection terminal, a third computing member for computing the voltage reference U$_{centraleRef}$ of the at least one common connection terminal according to a first prescribed function f depending at least on the total active power P$_{centrale}$, each at least one second automatic controller comprises a fourth member for measuring or determining a first individual reactive power Q$_{mes(i)}$ supplied or absorbed by the at least one electricity generation unit associated with the at least one second automatic controller and/or the at least one electricity storage unit associated with the at least one second automatic controller to the at least one common connection terminal, the at least one first central automatic controller comprises a first voltage corrector, having a second prescribed transfer function corr, the at least one first automatic controller being configured to compute $$U_{centraleRef}=f(P_{centrale})$$

$$U_{offset}=corr(U_{centraleRef}-U_{Rmes})$$

where U$_{offset}$ is a first central offset voltage, computed by applying the second prescribed transfer function corr of the first voltage corrector to a difference U$_{centraleRef}$−U$_{Rmes}$, the at least one first automatic controller is configured to compute the at least one second offset voltage U$_{offset(i)}$ according to a third prescribed function from the first central offset voltage U$_{offset}$ and to transmit the at least one second offset voltage U$_{offset(i)}$ to the at least one second automatic controller for the at least one electricity generation unit associated with the at least one second automatic controller and/or for the at least one electricity storage unit associated with the at least one second automatic controller, the at least one second automatic controller is configured to compute at least a local setpoint voltage U$_{ref(i)}$ for the at least one electricity generation unit associated with the at least one second automatic controller and/or for the at least one electricity storage unit associated with the at least one second automatic controller, according to $$U_{ref(i)} = U_{offset(i)} - K_{UQ(i)} \cdot Q_{mes(i)}$$

where $K_{UQ(i)}$ is a prescribed, non-zero coefficient.

2. The control device as claimed in claim 1, wherein the at least one first central automatic controller comprises another member for measuring or determining a first total reactive power $Q_{mes}$ of the plant, supplied or absorbed by the at least one electricity generation unit and/or the at least one electricity storage unit, the first prescribed function f depends at least on:

the total active power $P_{centrale}$ of the plant, supplied or absorbed by the at least one electricity generation unit and/or the at least one electricity storage unit, and on the first total reactive power $Q_{mes}$ of the plant, supplied or absorbed by the at least one electricity generation unit and/or the at least one electricity storage unit.

3. The control device as claimed in claim 1, wherein the first prescribed function f is affine or linear and depends on:

the total active power $P_{centrale}$ of the plant, supplied or absorbed by the at least one electricity generation unit and/or the at least one electricity storage unit.

4. The control device as claimed in claim 1, wherein the at least one first central automatic controller comprises another member for measuring or determining a first total reactive power $Q_{mes}$ of the plant, supplied or absorbed by the at least one electricity generation unit and/or the at least one electricity storage unit, the first prescribed function f is affine or linear and depends:

on the total active power $P_{centrale}$ of the plant, supplied or absorbed by the at least one electricity generation unit and/or the at least one electricity storage unit, and on the first total reactive power $Q_{mes}$ of the plant, supplied or absorbed by the at least one electricity generation unit and/or the at least one electricity storage unit.

5. The control device as claimed in claim 1, wherein the first prescribed function f comprises a hysteresis function, which takes for increasing values of the total active power $P_{centrale}$ of the plant, supplied or absorbed by the at least one electricity generation unit and/or the at least one electricity storage unit:

a prescribed nominal voltage value being strictly positive, when the increasing values of the total active power $P_{centrale}$ of the plant, supplied or absorbed by the at least one electricity generation unit and/or the at least one electricity storage unit become higher than or equal to a first prescribed strictly negative active power value while remaining lower than a second prescribed strictly positive active power value, a prescribed minimum voltage value being strictly positive, when the increasing values of the total active power $P_{centrale}$ of the plant, supplied or absorbed by the at least one electricity generation unit and/or the at least one electricity storage unit remain lower than the first prescribed strictly negative active power value, a prescribed maximum voltage value being strictly positive, when the increasing values of the total active power $P_{centrale}$ of the plant, supplied or absorbed by the at least one electricity generation unit and/or the at least one electricity storage unit are higher than the second prescribed strictly positive active power value, the prescribed nominal voltage value being higher than the prescribed minimum voltage value and being lower than the prescribed maximum voltage value, the hysteresis function taking for the decreasing values of the total active power $P_{centrale}$ of the plant, supplied or absorbed by the at least one electricity generation unit and/or the at least one electricity storage unit:

the prescribed nominal voltage value, when the decreasing values of the total active power $P_{centrale}$ of the plant, supplied or absorbed by the at least one electricity generation unit and/or the at least one electricity storage unit become lower than or equal to a third prescribed strictly positive active power value while remaining higher than a fourth prescribed strictly negative active power value, the prescribed minimum voltage value, when the decreasing values of the total active power $P_{centrale}$ of the plant, supplied or absorbed by the at least one electricity generation unit and/or the at least one electricity storage unit are lower than the fourth prescribed strictly negative active power value, the prescribed maximum voltage value, when the decreasing values of the total active power $P_{centrale}$ of the plant, supplied or absorbed by the at least one electricity generation unit and/or the at least one electricity storage unit are higher than the third prescribed strictly positive active power value, the third prescribed strictly positive active power value being lower than the second prescribed strictly positive active power value, the fourth prescribed strictly negative active power value being lower than the first prescribed strictly negative active power value.

6. The control device as claimed in claim 1, wherein the at least one first automatic controller further comprises at least a fifth receiving member to receive:

first voltage remote measurement values respectively of decentralized electricity production sources of the electricity consumption and/or production microgrid, remote by at least a first non-zero distance from one another and from the at least one common connection terminal of the plant, second voltage remote measurement values respectively of decentralized electricity consumer stations of the at least one line of the electricity consumption and/or production microgrid, remote by at least a second non-zero distance from one another and from the at least one common connection terminal of the plant, the first prescribed function f comprises:

computing a voltage maximum of the voltage $U_{Rmes}$ of the at least one common connection terminal of the plant and of the first voltage remote measurement values respectively of the decentralized electricity production sources of the electricity consumption and/or production microgrid, computing a voltage minimum of the voltage $U_{Rmes}$ of the at least one common connection terminal of the plant and of the second voltage remote measurement values respectively of the decentralized electricity consumer stations of the electricity consumption and/or production microgrid, taking into account a half-sum of the voltage maximum and of the voltage minimum for the computation of the voltage reference $U_{centraleRef}$.

7. The device as claimed in claim 6, wherein the third computing member comprises a second corrector of proportional-integral-derivative type supplying the voltage reference $U_{centraleRef}$ from the difference between a prescribed nominal voltage of the electricity consumption and/or production microgrid and a half-sum of the voltage maximum and of the voltage minimum.

8. The device as claimed in claim 1, wherein the at least one first central automatic controller comprises another member for measuring or determining a first total reactive power $Q_{mes}$ of the plant, supplied or absorbed by the at least one electricity generation unit and/or the at least one electricity storage unit, the at least one first automatic controller comprises:

a sixth member for computing reactive power setpoints of respective decentralized electricity production sources of the electricity consumption and/or production microgrid, remote by at least a non-zero distance from the at least one common connection terminal, which are proportions at least of the first total reactive power $Q_{mes}$ of the plant, supplied or absorbed by the at least one electricity generation unit and/or the at least one electricity storage unit.

9. The device as claimed in claim 8, wherein the at least one first automatic controller further comprises at least a seventh receiving member to receive:

third respective reactive power remote measurement values of the respective decentralized electricity production sources of the electricity consumption and/or production microgrid, the sixth computing member being configured to compute a second total reactive power equal to a sum of the first total reactive power $Q_{mes}$ of the plant, supplied or absorbed by the at least one electricity generation unit and/or the at least one electricity storage unit and of the third respective reactive power remote measurement values of the respective decentralized electricity production sources of the electricity consumption and/or production microgrid and to compute the reactive power setpoints of the respective decentralized electricity production sources of the electricity consumption and/or production microgrid as being proportions of the sum.

10. The device as claimed in claim 8, wherein the proportions in the reactive power setpoints of the respective decentralized electricity production sources of the electricity consumption and/or production microgrid correspond to respective ratios of a first prescribed reactive power capacity of the respective decentralized electricity production sources of the electricity consumption and/or production microgrid, divided by a sum of the first prescribed reactive power capacities of the respective decentralized electricity production sources of the at least one line of the electricity consumption and/or production microgrid and of the second respective prescribed reactive power capacities of the at least one electricity generation unit and/or of the at least one electricity storage unit.

11. The device as claimed in claim 1, wherein the third prescribed function comprises a division of the first central offset voltage $U_{offset}$ by a prescribed nominal voltage of the at least one electricity generation unit and/or of the at least one electricity storage unit.

12. The device as claimed in claim 2, wherein the at least one first central automatic controller comprises, as other member, another member for determining the first total reactive power $Q_{mes}$ of the plant, supplied or absorbed by the at least one electricity generation unit and/or the at least one electricity storage unit by summing the first individual reactive powers $Q_{mes(i)}$.

13. The device as claimed in claim 2, wherein the at least one first central automatic controller comprises, as other member, another member for measuring the first total reactive power $Q_{mes}$ of the plant, supplied or absorbed by the at least one electricity generation unit and/or the at least one electricity storage unit on the at least one common connection terminal.

14. A method for controlling a plant, wherein the plant comprises at least one electricity generation unit and/or at least one electricity storage unit, and at least one common connection terminal to at least one line of an electricity consumption and/or production microgrid, wherein the at least one common connection terminal is connected to the at least one electricity generation unit and/or to the at least one electricity storage unit, the method comprising:

computing and transmitting by at least one first central automatic controller for controlling the at least one electricity generation unit and/or of the at least one electricity storage unit at least one second offset voltage $U_{offset(i)}$ of each at least one electricity generation unit and/or of each at least one electricity storage unit to at least one second automatic controller for controlling each at least one electricity generation unit and/or electricity storage unit, so that the voltage of the at least one common connection terminal is set to a voltage reference $U_{centraleRef}$, measuring or determining by a first measuring or determining member of the at least one first central automatic controller a total active power $P_{centrale}$ of the plant, supplied or absorbed by the at least one electricity generation unit and/or the at least one electricity storage unit, measuring by a second measuring member of the at least one first central automatic controller a voltage $U_{Rmes}$ of the at least one common connection terminal, computing by a third computing member of the at least one first central automatic controller the voltage reference $U_{centraleRef}$ of the at least one common connection terminal according to a first prescribed function f depending at least on the total active power $P_{centrale}$, measuring or determining by a fourth measuring or determining member of the at least one second automatic controller a first individual reactive power $Q_{mes(i)}$ supplied or absorbed by the at least one electricity generation unit associated with the at least one second automatic controller and/or by the at least one electricity storage unit associated with the at least one second automatic controller to the at least one common connection terminal, the at least one first central automatic controller having a first voltage corrector, having a second prescribed transfer function corr, computing by the at least one first central automatic controller $$U_{centraleRef} = f(P_{centrale})$$

$$U_{offset} = corr(U_{centraleRef} - U_{Rmes})$$

where $U_{offset}$ is a first central offset voltage, computed by applying the second prescribed transfer function corr of the first voltage corrector to the difference $U_{centraleRef} - U_{Rmes}$, computing by the at least one first automatic controller the at least one second offset voltage $U_{offset(i)}$ from the first central offset voltage $U_{offset}$ according to a third prescribed function and transmitting by the at least one first automatic controller the at least one second offset voltage $U_{offset(i)}$ to the at least one second automatic controller for the at least one electricity generation unit associated with the at least one second automatic controller and/or for the at least one electricity storage unit associated with the at least one second automatic controller, computing by the at least one second automatic controller at least a local setpoint voltage $U_{ref(i)}$ for the at least one electricity generation unit associated with the at least one second automatic controller and/or for the at least one electricity storage unit associated with the at least one second automatic controller, according to $$U_{ref(i)} = U_{offset(i)} - K_{UQ(i)} \cdot Q_{mes(i)}$$

where $K_{UQ(i)}$ is a prescribed, non-zero coefficient.

15. A non-transitory computer-readable storage medium having instructions stored thereon that, when executed by a processor of at least one first central automatic controller and at least one second automatic controller, cause the processor to execute operations for controlling a plant, wherein the plant comprises at least one electricity generation unit and/or at least one electricity storage unit, and at least one common connection terminal, wherein the at least one common connection terminal is connected to the at least one electricity generation unit and/or to the at least one electricity storage unit and to at least one line of an electricity consumption and/or production microgrid, the operations comprising:

computing and transmitting by the at least one first central automatic controller for controlling the at least one electricity generation unit and/or of the at least one electricity storage unit at least one second offset voltage $U_{offset(i)}$ of each at least one electricity generation unit and/or of each at least one electricity storage unit to the at least one second automatic controller for controlling each at least one electricity generation unit and/or electricity storage unit, so that the voltage of the at least one common connection terminal is set to a voltage reference $U_{centraleRef}$, measuring or determining by a first measuring or determining member of the at least one first central automatic controller a total active power $P_{centrale}$ of the plant, supplied or absorbed by the at least one electricity generation unit and/or the at least one electricity storage unit, measuring by a second measuring member of the at least one first central automatic controller a voltage $U_{Rmes}$ of the at least one common connection terminal, computing by a third computing member of the at least one first central automatic controller the voltage reference $U_{centraleRef}$ of the at least one common connection terminal according to a first prescribed function f depending at least on the total active power $P_{centrale}$, measuring or determining by a fourth measuring or determining member of the at least one second automatic controller a first individual reactive power $Q_{mes(i)}$ supplied or absorbed by the at least one electricity generation unit associated with the at least one second automatic controller and/or by the at least one electricity storage unit associated with the at least one second automatic controller to the at least one common connection terminal, the at least one first central automatic controller having a first voltage corrector, having a second prescribed transfer function corr, computing (E5) by the at least one first central automatic controller $$U_{centraleRef} = f(P_{centrale})$$

$$U_{offset} = corr(U_{centraleRef} - U_{Rmes})$$

where $U_{offset}$ is a first central offset voltage, computed by applying the second prescribed transfer function corr of the first voltage corrector to the difference $U_{centraleRef} - U_{Rmes}$, computing by the at least one first automatic controller the at least one second offset voltage $U_{offset(i)}$ from the first central offset voltage $U_{offset}$ according to a third prescribed function and transmitting by the at least one first automatic controller the at least one second offset voltage $U_{offset(i)}$ to the at least one second automatic controller for the at least one electricity generation unit associated with the at least one second automatic controller and/or for the at least one electricity storage unit associated with the at least one second automatic controller, computing by the at least one second automatic controller at least a local setpoint voltage $U_{ref(i)}$ for the at least one electricity generation unit associated with the at least one second automatic controller and/or for the at least one electricity storage unit associated with the at least one second automatic controller, according to $$U_{ref(i)} = U_{offset(i)} - K_{UQ(i)} \cdot Q_{mes(i)}$$

where $K_{UQ(i)}$ is a prescribed, non-zero coefficient.

* * * * *